United States Patent [19]
Weidinger

[11] Patent Number: 5,810,143
[45] Date of Patent: *Sep. 22, 1998

[54] MOTOR VEHICLE FRICTION CLUTCH WITH A TRANSMISSION ELEMENT MOUNTED ON AN AXIAL GUIDE

[75] Inventor: Reinhold Weidinger, Unterspiesheim, Germany

[73] Assignee: Fichtel & Sachs AG, Schweinfurt, Germany

[*] Notice: The term of this patent shall not extend beyond the expiration date of Pat. No. 5,636,721.

[21] Appl. No.: 697,093

[22] Filed: Aug. 19, 1996

Related U.S. Application Data

[63] Continuation-in-part of Ser. No. 390,069, Feb. 17, 1995, Pat. No. 5,636,721.

[30] Foreign Application Priority Data

Feb. 19, 1994 [DE] Germany .......................... 44 05 344.4

[51] Int. Cl.⁶ ...................................... F16D 13/50
[52] U.S. Cl. .................... 192/70.27; 192/70.25; 192/89.23; 192/70.28
[58] Field of Search .............. 192/70.25, 70.27, 192/89.24, 111 A

[56] References Cited

U.S. PATENT DOCUMENTS

| | | |
|---|---|---|
| 2,009,558 | 7/1935 | Meyer . |
| 5,367,920 | 11/1994 | Bonfilio . |
| 5,385,224 | 1/1995 | Uehara . |
| 5,400,887 | 3/1995 | Mizukami et al. . |
| 5,409,091 | 4/1995 | Reik et al. . |
| 5,636,721 | 6/1997 | Weidinger ............................ 192/70.27 |

FOREIGN PATENT DOCUMENTS

| | | |
|---|---|---|
| 4239289 | 5/1993 | Germany . |
| 4326501 | 2/1994 | Germany . |
| 0694105 | 7/1953 | United Kingdom . |
| 2144496 | 3/1985 | United Kingdom . |
| 2227060 | 7/1990 | United Kingdom . |
| 2273751 | 6/1994 | United Kingdom . |
| 2280001 | 1/1995 | United Kingdom . |

*Primary Examiner*—Charles A. Marmor
*Assistant Examiner*—Saúl Rodríguez
*Attorney, Agent, or Firm*—Nils H. Ljungman and Associates

[57] ABSTRACT

A motor vehicle friction clutch with a pressure plate which is fastened with the interposition of a clutch disc with friction linings to a flywheel, and which has a common axis of rotation with the flywheel, comprising an application plate located non-rotationally—but so that it can move axially—in a clutch housing, and an application means to apply the application force, is designed so that the amount of work which must be performed by an application means for the engagement and release of the clutch becomes minimal. For this purpose, the clutch housing is provided with an axial guide for a transmission element located between the application means and the application plate, on which the transmission element, as long as there is a separation between the application plate and the friction linings of the clutch disc during an engagement and release movement, can track the movement of the application plate, while as soon as the application plate comes into contact with the friction linings of the clutch disc, the application plate can be clamped fast by means of a change in the angle initiated at its contact point with the application plate for the transmission of the application force, with the formation of a lever arm between this contact point and the engagement point of the application means on the axial guide.

20 Claims, 22 Drawing Sheets

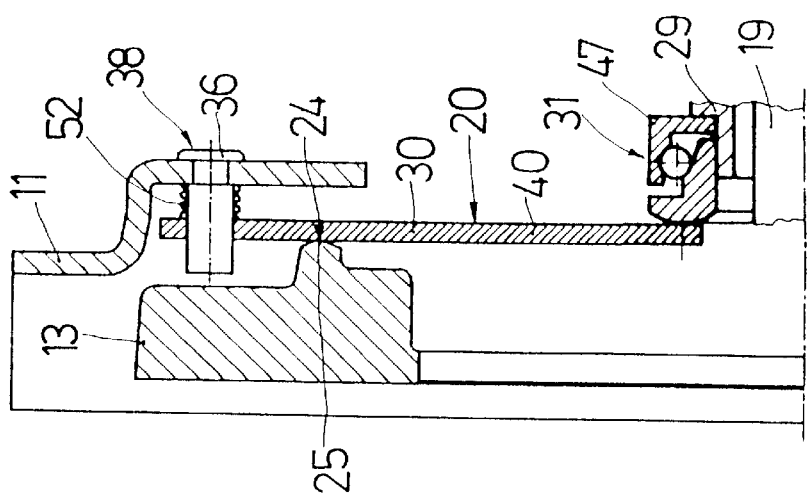
FIG. 2
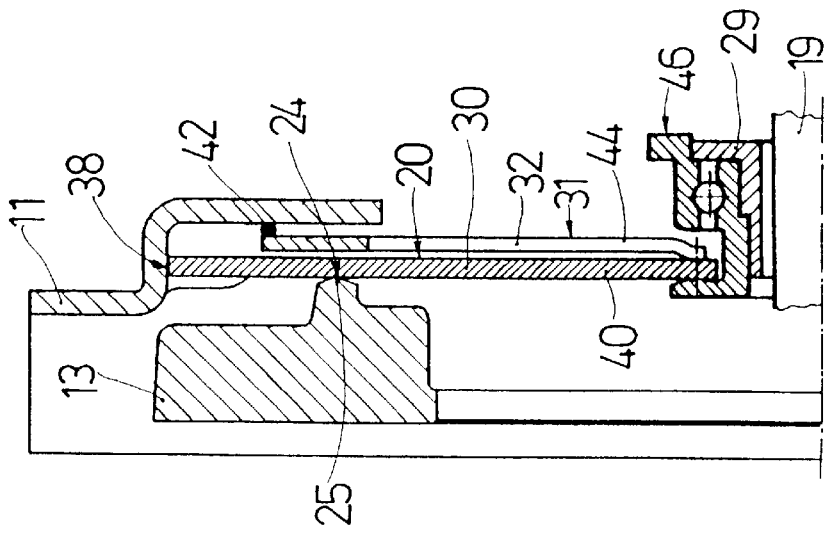
FIG. 3
FIG. 4

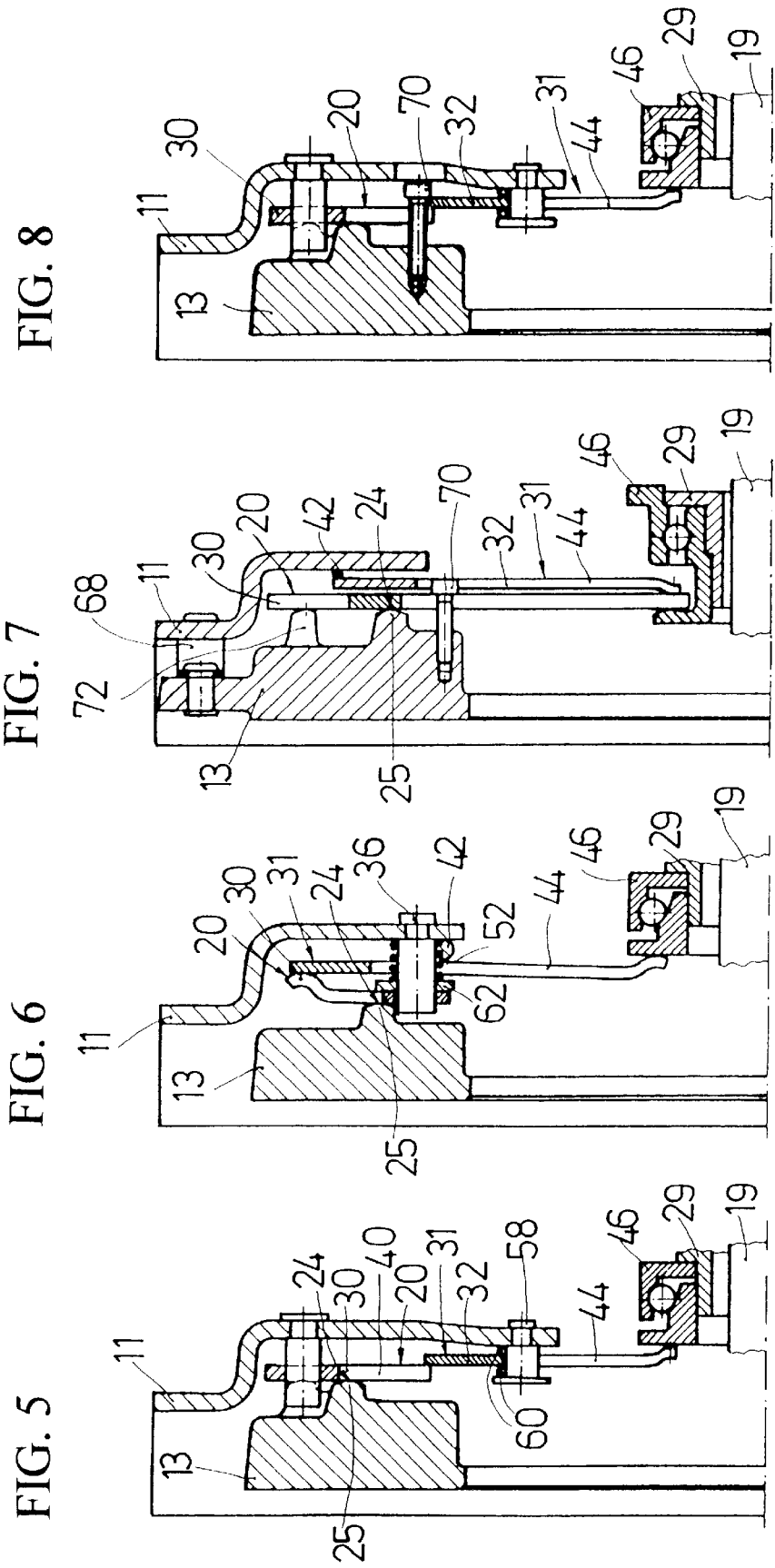

MOTOR VEHICLE FRICTION CLUTCH WITH A TRANSMISSION ELEMENT MOUNTED ON AN AXIAL GUIDE

CROSS-REFERENCE TO RELATED APPLICATION

The present application is a continuation-in-part of U.S. patent application Ser. No. 08/390,069, filed on Feb. 17, 1995 by Reinhold Weidinger, which issued as U.S. Pat. No. 5,636,721 on Jun. 10, 1997, entitled "Motor Vehicle Friction Clutch With a Transmission Element Mounted on an Axial Guide".

BACKGROUND OF THE INVENTION

1. Field of the Invention

This invention relates to a friction clutch.

2. Background Information

On some motor vehicle friction clutches as shown in FIG. 2 in German Patent No. 42 39 289 A1 (not prior art), the pressure plate is fastened to a flywheel with the interposition of a clutch disc with friction linings and lining springs, whereby the pressure plate and the flywheel have a common axis of rotation. The pressure plate is provided with an application plate located non-rotationally—but so that it can move axially—in a clutch housing, and is provided with a membrane spring which acts as an application means, whereby the membrane spring is connected to studs or pins fastened to the clutch housing. To release the clutch, a release mechanism is placed in contact with the radially inner ends of flexible tabs of the membrane spring, on its side facing away from the application plate. When the release mechanism is displaced from its initial position toward the application plate, the flexible tabs of the membrane spring are deformed so that their ends are moved radially outside the studs of the application plate, whereby first the application force exerted by the application plate on the friction lining of the clutch disc is reduced to zero, and then the application plate, assisted by the action of leaf springs located in the circumferential area and connecting the application plate to the clutch housing, is pushed away from the clutch disc. Conversely, to engage the clutch, the membrane springs are relaxed and displaced by the release mechanism, while it, the membrane spring, is relaxed, first to apply the application plate against the friction lining of the clutch disc, and then, upon further relaxation, to apply the application force. Since the membrane spring experiences a deformation both during the application/removal of the application force and during the displacement of the application plate relative to the clutch disc, its deformation resistance must be overcome during the entire release and engagement process. The amount of work which must be performed is therefore relatively high.

During the clutch release and engagement process, along the entire deformation travel of the membrane spring, a translation or translation ratio is applied which is a function of the distance between the release mechanism and the studs in relation to the distance between the latter, the studs and the point of contact of the membrane spring with the application plate. On account of the length of the deformation travel of the membrane spring, the translation which can be achieved with such pressure plates is limited, generally to approximately 3:1, so that the amount of force which must be applied to the release mechanism, called the release force below, is relatively high. On a friction clutch of the prior art, therefore, it would be helpful if, during the release, the lining springs on the clutch disc would effect a gradual reduction of the transmissible torque by a reduction of the application force. By maintaining a constant position of the membrane spring in the clutch housing by means of an adjustment device, provisions would be made so that the application force, and thus by means of the above-mentioned translation, the release force does not increase further when the friction linings are worn.

OBJECT OF THE INVENTION

The object of the invention is to design a friction clutch of the type described above so that both the force and the amount of work required for engagement and release are minimized.

SUMMARY OF THE INVENTION

The invention teaches that this object can be accomplished by the following features: wherein the clutch housing is provided with an axial guide for a transmission element which is located between the application means and the application plate, on which the transmission element, as long as there is no transmission of an application force between the application plate and the friction linings of the clutch disc during an engagement and release movement, can track the movement of an engagement and release mechanism, while as soon as it, the application plate, comes in contact with the friction linings of the clutch disc for the transmission of the application force, it can track by means of a deformation the movement of the engagement and release mechanism at its contact point with the application plate with a translation which, after the generation of a clamping connection between the transmission element and the axial guide, is a function of the distance between the point of engagement of the application means on the transmission element and the contact point of the transmission element with the application plate in relation to the distance between this contact point and the clamping connection of the transmission element on the axial guide. Because the transmission element is movably mounted on an axial guide of the clutch housing, the invention teaches that in a first movement segment in which the application plate is moved toward the clutch disc, but does not yet transmit any application force to the clutch disc, the transmission element can be displaced parallel to itself. That element of the friction clutch which the invention teaches is used to transmit the application force of the application means, for example of a membrane spring of an engagement mechanism, to the application plate, makes possible an axial displacement of the application plate without having to overcome a deformation resistance. The amount of work performed in this movement segment is therefore insignificant.

In a second movement segment, in which the application plate must be brought into contact with the friction lining of the clutch disc and the application force must be transmitted, the transmission element is deformed in the manner described above. The movement of an engagement or release mechanism is now no longer—as in the first movement segment—transmitted with the translation 1:1 to the transmission element which can move along the axial guide, but effects a translation which is a function of the distance between the application means such as a membrane spring or an engagement mechanism and that point at which the clamping connection of the transmission element with the clutch housing occurs, in relation to the distance between the clamping connection point and the point of contact between the transmission element and the application plate. On account of the short length of the second movement segment, which equals the deformation travel on the friction lining of the clutch disc, this translation can be more than twice as high as in pressure plates of the prior art, and can reach values between 6:1 and 7:1. These translations can change slightly when the lining on the clutch disc is resilient, but a resilient lining has no influence on the theoretical result. On account of the large translation, to transmit a specified application force to the application plate, a release or engagement mechanism can be used whose potential force is approximately one-half that of comparable conventional devices. For example, when an actuator is used with the engagement or release mechanism, it can be designed with much more compact dimensions and will thus be much more economical, or on trucks, a lower-powered servo-assist can be used for the engagement or release, or such a servo-assist can even be eliminated altogether.

The amount of work to be performed, since it is a function of the level of the application force and of the size of the second movement segment, and since the latter is very small corresponding to the extremely small deformation on the friction lining and the resilience of the lining, is negligible. Accordingly, no significant work needs to be performed for the engagement and release process.

The following discloses a very simple axial guide in which the transmission element can be displaced on studs: wherein the axial guide is formed by these studs which are engaged in recesses of the transmission element. On account of the presence of the springs, wherein the studs are each surrounded by a spring which keeps the transmission element in contact with the application plate and is supported on the clutch housing, a force is always exerted on the transmission element toward the application plate. This multiplicity of individual springs can be eliminated if the application means are formed by a membrane spring, wherein the application means are formed by a membrane spring which is located between the clutch housing and the transmission element.

Also disclosed is an embodiment by means of which, as soon as the application plate has reached the friction lining of the clutch disc, the stud is very reliably tilted or chocked or jammed in the hole of the clutch housing, since the tilting is effected by means of a lever supported by the stud in question, wherein the studs are mounted in the clutch housing so that they can move in the axial direction and support a lever, by means of which they can be tilted when acted on by the transmission element in the respective bearing.

Also disclosed is an advantageous embodiment wherein the transmission element is formed by a membrane disc, which comes into contact with one side against a shoulder of the application plate, which shoulder acts as a contact point, and with its other side is supported by means of the at least one spring on the clutch housing, which spring corresponds to the studs of the axial guide. This is an advantageous embodiment for the transmission element, since a membrane disc which is located between the application plate and an engagement mechanism and acts, for example, as an application means, can be inserted with sufficient natural or inherent or bias or prestress into the clutch housing, to push the engagement mechanism back into its initial position, after the forces acting on it have been neutralized.

Also disclosed are stops wherein the application plate is configured in the circumferential area with energy storing devices which act on the clutch housing to press against the transmission element, and has at least one stop on its side facing the transmission element, next to each of the studs. The purpose of the stops disclosed above is to prevent the transmission element from being deformed when it is in a non-positive connection with the application plate. Therefore, for a torque-free support of the transmission element the stops are located as close as possible next to the corresponding studs. By means of the energy storing device, the application plate is released from the friction lining of the clutch disc, taking the transmission element along with it.

The action of the energy storing device is also disclosed, wherein the application plate is held in contact against the stop by means of a retaining means against the action of an energy storing device which pushes the application plate away from the clutch housing and is engaged in the circumferential area with the application plate. This is in contrast to the action disclosed above, so that during release of the clutch, there is a forced clearing of the application plate with respect to the transmission element. The purpose of this measure is to counteract vibrations of the application plate when it has been released, preferably when the stress on it has been removed. The magnitude of the excursion can be limited by the retaining means.

Also disclosed is a motor vehicle friction clutch with an arrangement which includes the lining springs on the clutch disc, which arrangement, during the release process, by means of a portion of the actuation distance of the engagement and release mechanism, effects a gradual decrease of the torque transmitted by the friction clutch or the clutch disc, characterized by the fact that the transmission element, as a result of its location on the axial guide and pressurization by means of at least one spring toward the application plate, with respect to its travel during each engagement process, can be once again adjusted to the current thickness of the friction linings and of the resilience of the lining on the clutch disc. As described above, a change in the thickness of the friction linings which results in an axial displacement of the application plate with respect to the clutch housing does not have any adverse effect on the pressure plate claimed by the invention, since the transmission element, on account of its location on the axial guide, is displaced by the at least one spring during each engagement process, which always drives the application toward the clutch disc until it comes to a stop in contact with the friction lining of the clutch disc. Consequently, since there is an automatic "readjustment" during each engagement process, a separate adjustment mechanism in the sense disclosed by German Patent No. 42 39 289 A1 becomes unnecessary, because on account of the large translation ratio which can be achieved with the configuration of the pressure plate taught by the invention and which requires only a small or low force for engagement or release, a slight increase in the application force, and thus in the engagement or release force, as a function of the wear is acceptable, so that the second function of the separate adjustment device disclosed by the above-referenced prior art, namely to achieve a constant position of the membrane spring inside the clutch housing, to guarantee that the application force is independent of the wear of the friction linings on the clutch disc, is also unnecessary.

The tracking capability of the engagement and release mechanism with regard to the transmission element in the axial direction can be easily realized by means of a common hydraulic engagement or release mechanism, since the latter, if the clutch point or coupling point has been displaced when there is a change in the stroke of the transmission element in the axial direction, can draw the missing amount of hydraulic fluid from a compensation vessel.

Also disclosed is an engagement mechanism wherein the application means are formed by an engagement mechanism which acts on the transmission element, and in which the travel can be adjusted to the respective movement segment of the transmission element. When the engagement mechanism, as disclosed above, is designed as an application means, the membrane spring can be eliminated.

BRIEF DESCRIPTION OF THE DRAWINGS

Embodiments of the invention are explained in greater detail below, with reference to the accompanying drawings.

FIG. 2 is a cross section the same as in FIG. 1, but where essentially only the application plate, the transmission element, the membrane spring and the release mechanism exerting tension are shown, and the transmission element, in contrast to FIG. 1, is in frictional contact radially outwardly with the clutch housing;

FIG. 3 same as FIG. 2, but with a transmission element which is separated radially outwardly from the clutch housing, and an engagement mechanism which exerts pressure;

FIG. 4 same as FIG. 3, but with a different mounting of the transmission element;

FIG. 5 same as FIG. 3, but with a membrane spring which acts on the transmission element;

FIG. 6 same as FIG. 5, but with a transmission element which is curved in the axial direction;

FIG. 7 same as FIG. 1, but with a retaining means which holds the application plate in contact with the transmission element;

FIG. 8 same as FIG. 7, but with the retaining means contacting the membrane spring from behind;

DESCRIPTION OF THE PREFERRED EMBODIMENT

Figure 1:
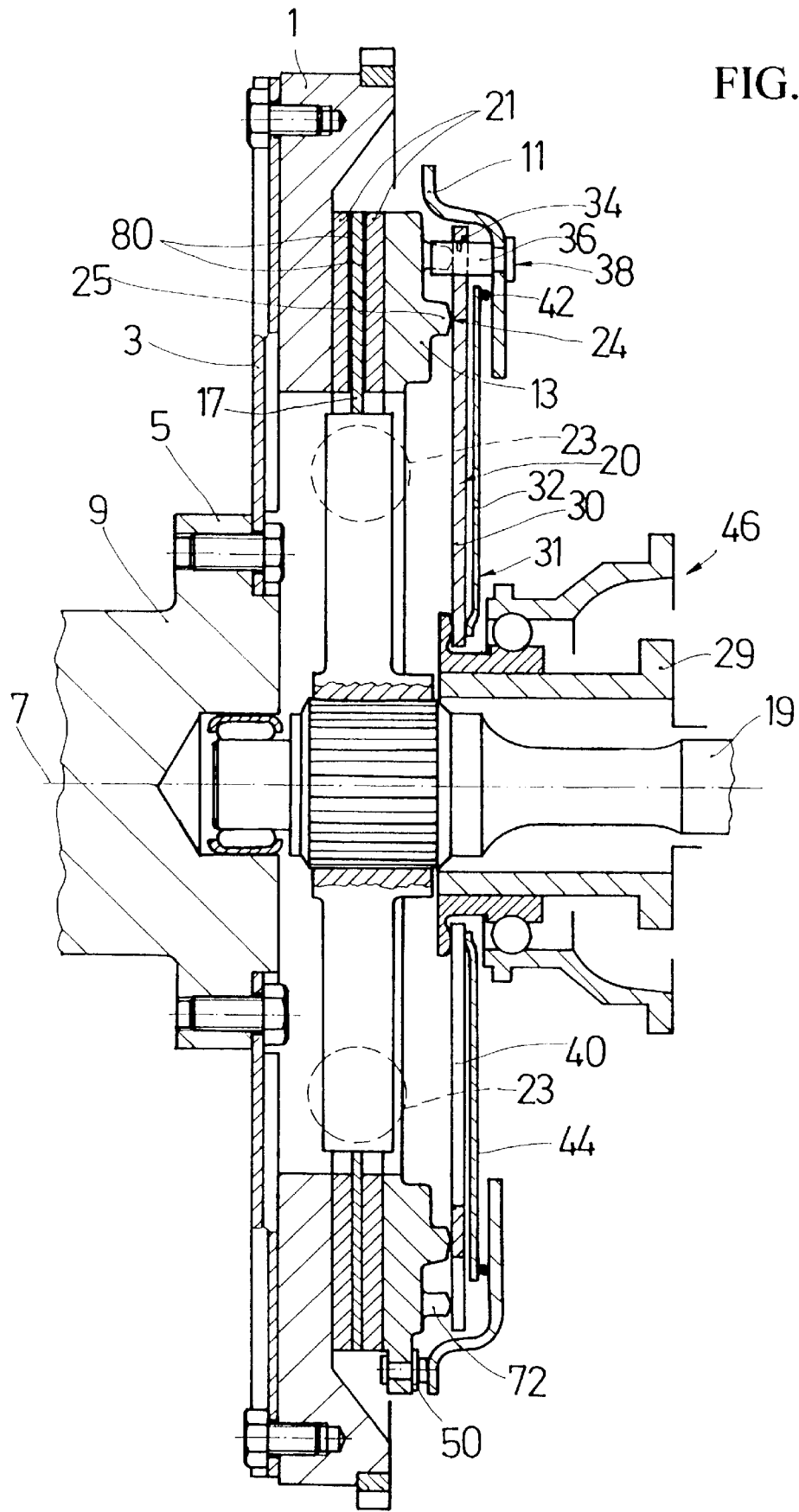
FIGS. 1 and 1a show an axial longitudinal section through a motor vehicle friction clutch, which is illustrated with an application plate, a transmission element in the clutch housing, a membrane spring and a release mechanism which exerts tension.

The motor vehicle friction clutch illustrated in FIG. 1 comprises a flywheel 1 which is equiaxially fastened by means of a sheet metal disc 3 to a flange 5 of a crankshaft 9 of an internal combustion engine, whereby the crankshaft 9 rotates around an axis of rotation 7. The flywheel, in the manner of the prior art and therefore not described in any further detail, supports an essentially ring-shaped clutch housing 11 which, on the side of the flywheel 1 facing away from the crankshaft 9, encloses an application plate 13 which is essentially in the shape of an annular disc. The application plate is guided in the circumferential direction non-rotationally, but so that it can be displaced axially on the clutch housing 11. Axially between the flywheel 1 and the application plate 13, coaxial with the axis of rotation 7, there is a clutch disc 17 which can be displaced axially in the conventional manner, but is coupled non-rotationally to an input shaft 19 of a transmission which is not shown in any greater detail. This clutch disc 17 supports friction linings 21 with lining springs 80 and can include torsional vibration dampers 23 as well as frictional vibration dampers not shown in any greater detail.

Between the clutch housing 11 on the one side and the application plate 13 on the other side, there are a membrane disc 30 which acts as a transmission element 20, and a membrane spring 32 which acts as the application means 31, whereby the membrane disc 30, in the radially outer area, has recesses 34 which are used for the passage of studs 36 which are fastened to the clutch housing 11 and extend in the axial direction of the pressure plate, and the membrane disc 30 is movably mounted by means of these recesses on the studs 36, which are part of an axial guidance 38 for the membrane disc 30. The membrane disc 30, which has tabs 40 which extend radially inward, comes into contact with its opposite side against stops dr shoulders 25 of the application plate 13 which function as contact points 24.

The membrane spring 32 is braced between the membrane disc 30 and a wire ring 42 which surrounds the axis of rotation 7, and which is in contact with the corresponding side of the clutch housing 11, and presses the tabs 40 of the membrane disc 30 by means of its own flexible tabs 44 which extend radially inward around the shoulders 25 of the application plate 13 onto the latter. There is a translation of the application force generated by the membrane spring 32 between the application point of the flexible tabs 44 and the shoulders 25 in relation to the latter and the studs 36, to which the membrane disc 30 can be clamped by deformation. By means of a release mechanism 46 which is guided so that it can be displaced axially on a guide tube 29 of the transmission, and which is engaged on the radially inner ends of the flexible tabs 40 of the membrane disc 30, the application plate 13 can be relieved of the application force of the membrane spring and released.

During release, as a result of a movement of the release mechanism 46 as illustrated in FIG. 1 to the right, the excursion of the tabs 40 of the membrane disc 30 and of the flexible tabs 44 of the membrane spring 32 is eliminated, as a result of which the application force acting between the application plate 13 and the friction lining 21 of the clutch disc 17 is also eliminated. The deformation of the membrane disc 30 and thus its clamping connection to the studs 36 of the axial guide 38 is completely eliminated as soon as the application plate 13, although still in contact with the friction lining of the clutch disc 17, no longer transmits any application force to the friction lining 21. The neutralization of the application force is achieved by an axial movement of application plate 13 and membrane disc 30 over a negligibly short movement segment which corresponds to the deformation of the friction linings 21 caused by the application force.

In an additional movement segment, the membrane disc 30 is pulled by the release mechanism 46 with a movement parallel to itself into its release position. The application plate 13 is simultaneously pushed into its release position, to the right as shown in FIG. 1, by energy storing devices 50 in the form of leaf springs fastened in the circumferential area and connecting the application plate 13 to the clutch housing 11.

For engagement, the release mechanism 46 is released, so that the membrane spring 32, on account of its prestress, can displace the membrane disc 30 by means of a movement of the latter parallel to itself in the axial direction, until the membrane disc 30 comes into contact with the shoulders 25 of the application plate 13, and has pushed them against the friction lining 21 of the clutch disc 17. This position of the membrane disc 30 and application plate 13 forms the clutch point, since, starting from this position, the engagement is effected by application of the application force. As a result of the continued action of the membrane spring 32, the tabs 40 of the membrane disc 30 are moved toward the application plate 13 around their shoulders 25, whereby the membrane disc 30 is clamped on the studs 36 of the axial guide 38, and the transmission of the application force to the application plate 13, and from the latter to the friction lining 21 of the clutch disc 17, proceeds with the above-mentioned translation.

On the pressure plate claimed by the invention, accordingly, only inside the above-mentioned movement segment, in which the tabs 40 of the membrane disc 30 are moved around the shoulders 25 of the application plate 13, is there a deformation of the membrane disc 30. On account of the negligible length of this first movement segment, the work which is required to deform the membrane disc 30 is also negligibly low. In the additional movement segment, in which the membrane disc 30 is only displaced parallel to itself without any deformation, only as much work must be applied as is necessary to overcome the friction during the pushing movement. The work required for the total release or engagement process is consequently minimal.

On account of the mobility of the membrane disc 30 in the axial direction inside the additional movement segment, its stroke length during each engagement process is a function of the wear and thus of the thickness of the friction linings 21 on the clutch disc 17, since the membrane disc 30, driving the application plate 13, is always moved far enough toward the clutch disc 17, until the application plate 13 comes into contact with the friction linings 21. Then, when the application force is applied, the clamping connection between the membrane disc 30 and the studs 36 of the axial guide 38 is produced, so that a readjustment of the coupling or clutch point occurs during each engagement process.

Since the movement segment in which the membrane disc 30 can be moved parallel to itself increases in size with increasing wear to the friction linings, a release mechanism 46 is required, the stroke length of which can be adapted to the axial shifting of the coupling or clutch point. This is easy to accomplish, in particular when a hydraulic release mechanism 46 is used, since when there is a change in the stroke length, the hydraulic release mechanism 46 can draw the missing amount of hydraulic fluid. Such a release mechanism 46 is disclosed, for example, in German Patent No. 39 16 317 A1.

If, in the absence of a membrane spring 32, the application means 31 are formed by an engagement mechanism 47 (shown in FIG. 3), it is also possible to achieve a change in the stroke length with it in the manner described above. Embodiments with an engagement mechanism 47 are described in detail below.

In the illustration in FIG. 2, which is simplified in relation to FIG. 1 and shows a pressure plate which differs from FIG. 1 in that the axial guidance 38 of the membrane disc takes place in the radially outer area on a segment of the clutch housing 11 which runs axially. Consequently, the clamping of the membrane disc 30 occurs when there is an excursion of the tabs 40 around the shoulders 25 with respect to the segment of the clutch housing 11 which runs axially.

FIGS. 3 through 8 are simplified in relation to FIG. 1 and omit details of the structure of FIG. 1.

FIG. 3 shows a pressure plate in which the membrane disc 30, as claimed by the solution illustrated in FIG. 1, is mounted so that it can be displaced on studs 36 of the axial guide 38. In this model, however, an engagement mechanism 47 acts as the application means 31, while one of the springs 52 surrounding the studs 36, the force of which is lower by several times than the application force, provides for the membrane disc 30 to be held in contact with the shoulders 25 of the application plate 13. During release, the application plate 13 is moved by the energy storing devices 50 (FIG. 1) located in its circumferential area toward the studs 36, and thereby displaces the membrane disc 30 parallel to itself against the action of the springs 52. During engagement, this process takes place in the opposite direction, whereby, as soon as the application plate 13 has come into contact with the friction lining 21 of the clutch disc 17, the membrane disc 30, which is clamped to the studs 36 in the vicinity of its tabs 40, experiences an excursion toward or with respect to the shoulders 25 of the application plate 13.

In the embodiment illustrated in FIG. 4, the studs 36 are mounted so that they can move in the clutch housing 11, and support a lever 55 which is supported on one end by means of a spring 52 on the clutch housing 11, and on the other end on the membrane disc 30 in its radially outer area. During engagement, the engagement mechanism 47 which acts as the application means 31 displaces the membrane disc 30 parallel to itself, until the application plate 13 comes into contact with the friction lining 21 of the clutch disc 17. When the application force is applied, the axially movable studs 36 are clamped by means of the levers 55 in the clutch housing 11, whereupon the excursion of the tabs 40 of the membrane 30 can take place toward the application plate 13 around their shoulders 25.

FIG. 5 illustrates an additional embodiment of the pressure plate with a membrane spring 32 which acts as the application means 31. In this case, the membrane disc 30 which is mounted so that it can move on the studs 36 is designed with severely shortened tabs 40, while the membrane spring 32, which is braced radially farther inward on the clutch housing by means of studs 58 and wire rings 60, extends radially outward just far enough so that it becomes engaged with the shortened tabs 40 of the membrane disc 30. As soon as a release mechanism 46 transmits a force toward the application plate 13 to the flexible tabs 44 of the membrane spring 32, the membrane spring 32 is separated from the tabs 40 of the membrane disc 30 in the radially outer area, so that the transmission of an application force ends and the application plate 13, under the action of the energy storing devices 50 (FIG. 1) in its circumferential area displaces the membrane disc 30 toward the membrane spring 32. For engagement, the release mechanism 46 is pulled back into its initial position by relieving the force.

On the pressure plate illustrated in FIG. 6, the membrane spring 32 which forms the application means is fastened to the studs 36 of the axial guide 38, while the plastically deformed membrane disc 30 can be moved in the axial direction of the studs 36. In this case, the membrane spring 30, which is in contact with the membrane disc 30 in the radially outer region, pushes the membrane disc 30 toward the pressure plate 13, and pushes it and the pressure plate 13 until the latter comes in contact with the friction lining 21 of the clutch disc 17. As a result of the deformation of the membrane disc 30 during transmission of the application force, this deformation force causes a tilting of the discs 62 located between it and the membrane spring 32 and supported by springs 52 on the clutch housing 11, on the studs 36, and thus a clamping of the membrane disc 30 on the axial guide 38. The membrane disc 30 is then in contact with the shoulders 25 of the clutch disc 13, and is bent with its area lying radially outside these shoulders around the shoulders 25 toward the application plate 13. To release the application force, a release mechanism 46 is moved toward the application plate 13 against the radially inner ends of the tabs 44 of the membrane spring 32.

In FIG. 1, the energy storing devices 50 were prestressed in the circumferential area of the application plate 13 so that, when the application force was released, the application plate was moved toward the membrane disc 30 or toward a membrane spring 32. In contrast, FIG. 7 shows a pressure plate in which energy storing devices 68 in the form of leaf springs are active in the opposite direction, and to suppress vibrations of the application plate, they prestress or bias the application plate toward the friction lining of the clutch disc 17, and thus generate a forced clearance of the application plate 13 from the transmission element 20. These energy storing devices 68 cooperate with a retaining means 70 which is formed, as shown in FIG. 7, by screws which are screwed into each threaded hole of the application plate 13, the heads of which are supported on the membrane disc 30 with their sides facing the application plate 13. By means of these retaining means, the application plate 13 is prevented from moving excessively far from the membrane disc 30 as a result of the action of the energy storing device 68. By means of shoulders 72 which are formed on the pressure plate radially outside its shoulders 25 and next to the studs 36, the membrane disc 30 can in this case be supported so that a deformation of the membrane disc 30 in the vicinity of the studs 36 can be prevented. Such shoulders 72, as shown in FIG. 1, can also be advantageously used with energy storing devices 50 which work in the opposite direction.

The pressure plate illustrated in FIG. 8 has the same basic construction as the one illustrated in FIG. 5, but is designed with a retaining means 70 in the form of a screw, the head of which is supported with its side facing the application plate 13 on the membrane spring 32, which in turn means that this pressure disc or plate is designed with an energy storing device 68 in the circumferential area of the application plate 13, by means of which the latter can be pressed toward the friction lining of the clutch disc.

Instead of the membrane disc 30 as shown in the drawing, the transmission element 20 can also be formed by lever-like individual segments, each of which is located on at least one stud 36 in the axial guide 38. Since these individual segments are located inside the clutch housing 11, as is the above-mentioned membrane disc 30, they are not illustrated in an additional figure.

In one embodiment of the invention when the membrane disc 30 is held against the stops 25 by among other structures the application means 31, the membrane disc 30 is compressed and thus "oil cans" such that the end 30a with the holes 30b, which holes 30b surround the studs 36, and can grasp and release the studs 36. The end 30a is distorted by the oil canning such that the holes 30b become distorted and grasp the studs 36. As the release mechanism 46 moves the end 30c of the membrane disc 30 to the right, the oil canning of the membrane disc 30 is preferably reduced, therefore reducing the distortion of the end 30a of the membrane disc 30, and thus the holes 30b will be enlarged along the longitudinal axes of the studs 36 such that they no longer clamp onto the studs 36 thereby allowing the application means 30 to move at least relatively freely upon the studs 36. When the release mechanism 46 moves to the left which permits the end 30c of the membrane disc 30 to move to the left, the holes 30b again grips the studs 36. Thus the membrane disc 30 applies a force onto the stops 25 to engage the clutch friction lining 21.

As the application means 31 reduces pressure against the end 30c of the membrane disc 30, the end 30c is moved to the left, which therefore in at least one embodiment "oil cans" the membrane disc 30 between the stops 25 and the point of contact 30d between membranes disc 30 and release element 46. This oil canning twists or distorts the end 30a of the membrane disc 30 so that the membrane disc 30 again deforms at end 30a to clamp the holes 30b about the studs 36.

In other words, as the stresses within the membrane disc 30 are built up, and since the length of the membrane disc 30 from the end 30c to the end 30a remains in one embodiment, substantially constant during the engaging and disengaging of the clutch, the material which makes up the length of the membrane disc 30 from the end 30a to end 30c remains substantially linearly constant. Therefore, the membrane disc 30 must deform as an oil can deforms and is well known with Belleville springs and membranes, that as the end 30c is deformed to cause an oil canning, the stresses are transmitted throughout the membrane disc 30, thereby distorting the end 30a of the membrane disc 30 and grasping and releasing the studs 36. Since the inner diameter of the membrane disc 30, which is defined by the end 30c of the membrane disc 30, remains substantially constant in diameter in one embodiment, during compression and relaxation, the end 30a will distort in an S-shape substantially to maintain the linear length of the membrane disc 30 along the surface of the disc 30 from the end 30a to the end 30c, and thereby forming somewhat of an undulating or S-shaped distortion of the membrane disc 30, thereby producing the distortion at the end 30a which is at least partially S-shaped thereby reducing the diameter of the holes 30b in the longitudinal axis of the studs 36 to clamp the membrane disc 30 to the studs 36.

Figure 1A:
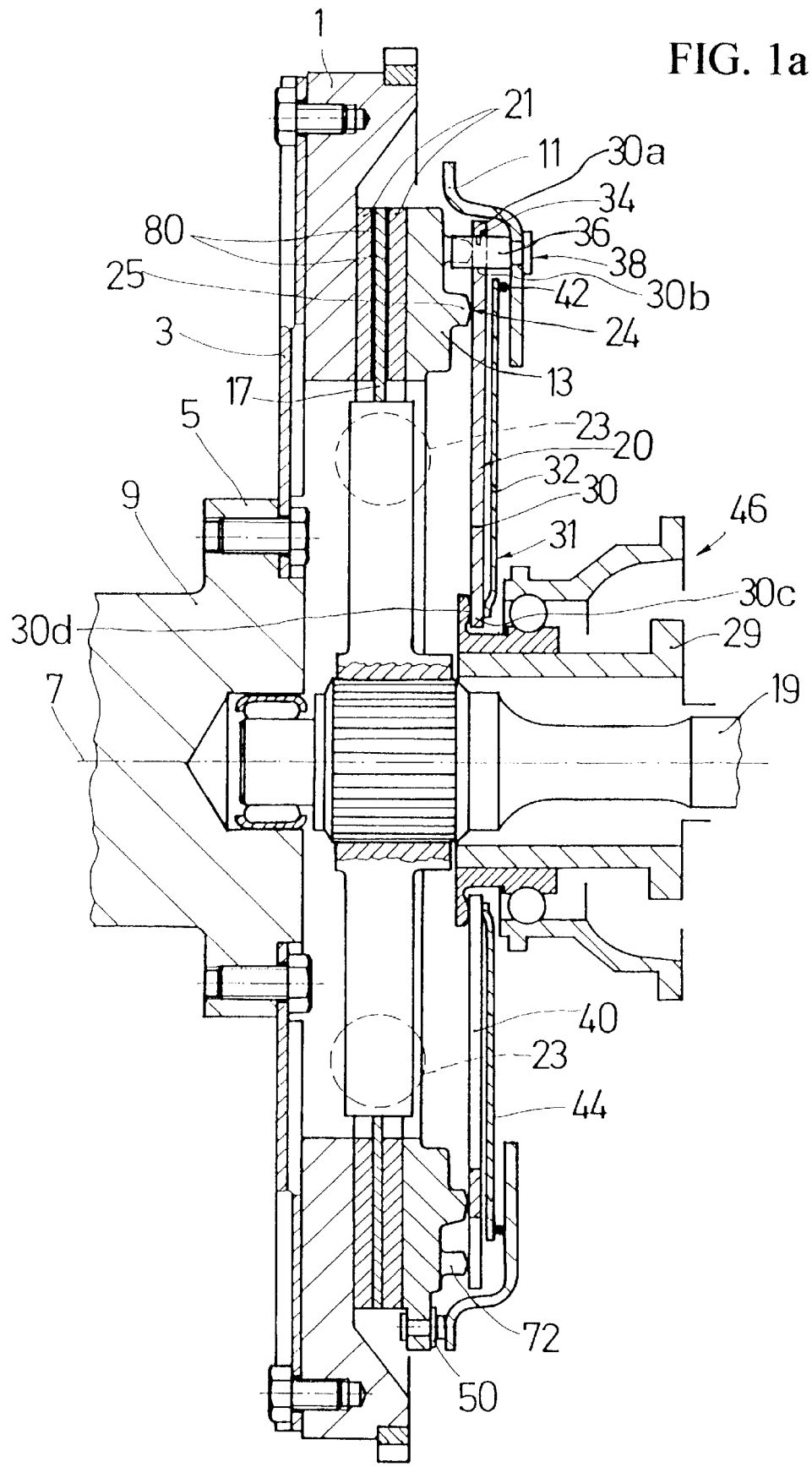

Further regarding the membrane disc 30, as is well known with membrane or Belleville discs or springs depending upon the thickness, the length and restraints built within the Belleville washer or disc, which restraints restrict the movement of the diaphragm structure of the Belleville washer or disc, as the Belleville washer is moved from a relaxed or externally unrestricted state, the stresses within the Belleville disc or spring are set up in a static fashion. The static stresses within the Belleville disc when the disc 30 is not externally stressed by the release mechanism 46, typically form a curve where the center portion of the disc represented by the end 30c in FIG. 1a, is displaced axially from the end 30a, as shown in FIG. 1. The curve of the Belleville washer or membrane 30, will have this curvature, and the holes 30d which grasp the studs 36 due to the distortion thereof, and therefore clamp the membrane disc 30 onto the studs during operation. These holes 30d on end 30a will be bored so that they align with the studs 36 when the release mechanism 46 is moved to the right position in FIG. 1. As the end 30c of the membrane spring 30 is moved, in one embodiment, from a substantially relaxed or externally not stressed position, to an externally stressed position, the stresses that are built up in a Belleville disc or spring will distort the Belleville spring or membrane 30, such that an S-type curve forms in the membrane disc 30. These curve or S-curves are due to the inherent design and structure of Belleville springs, due to the restrictions on at least one portion of the Belleville spring. This portion of the Belleville spring may be the external periphery of the spring which restricts a substantial change in the outside diameter of the Belleville spring, or it may be a portion of the spring about which stresses propagate. Therefore, since the length of the Belleville spring from the inside diameter, represented by the end 30c, to the outside diameter, represented by the end 30a, of membrane disc 30, restricts the expansion of the membrane spring 30, these curves will form, which one embodiment will distort the end 30a of the Belleville or membrane disc 30, such that the membrane disc 30 distorts its holes 30b, and thus they clamp against the studs 36. When the Belleville washer or membrane spring 30 assumes a less stressed position, the holes 30b move such that their longitudinal axes are preferably in alignment with the longitudinal axes of the studs 36. In an alternative embodiment, the longitudinal axes of the studs 36 and the holes 30b may not be aligned, and the holes 30b may not have their longitudinal axis substantially perpendicular to the plane of the end 30a of the membrane spring 30. Therefore, depending upon the inherent characteristics of the membrane disc 30 which is used in a particular embodiment, the holes may or may not have a longitudinal axes which are perpendicular to the surface of the end 30a of the membrane spring 30. However, usually, and preferably, the holes 30b have longitudinal axes which are perpendicular or substantially perpendicular to the opposite surfaces of the membrane disc 30.

As can be seen in FIGS. 1 and 1a, the membrane disc 30 is preferably substantially thicker than the application means 31, which application means is also preferably a Belleville or a membrane disc. By making the membrane disc 30 thicker than the application means 31, the stresses which propogate through the Belleville or membrane disc 30, will set up stresses which are different at the different outer major surfaces of the membrane or Belleville disc 30, which stresses will provide the undulating or S-shaped distortions in the membrane disc 30. In one embodiment, by providing a somewhat different material characteristic at the contact points 24, such that, the contact point 24 may act as a fulcrum point whereby the stresses are propagated from the inside portion of the Belleville or membrane disc 30, and restricted by the contact points 24, to the outer portion of the membrane disc 30 at the end 30a, the end 30a will move back and forth in FIG. 1 and 1a in a left and right manner, such that the distortion of the end 30a forms a one position, in which the holes 30b are aligned with the studs 36 and another position, preferably in one embodiment when the S-shape or other shape has been formed at the end 30a of the membrane disc 30, which distortion will clamp the holes 30d onto the studs 36.

In one embodiment of the invention, the membrane disc preferably has a ratio of length between the ends 30a and 30c to the thickness of a representative portion of the disc of about 30 to 1. In other embodiments of the invention, the membrane disc 30 may have different ratios, for example 100 to 1, and 40 to 1, and 50 to 1.

Belleville springs are readily available from many sources, who both design and manufacture such Belleville springs. An example of a manufacturer of Belleville springs is E.C. Styberg Engineering Co., Inc. of Racine, Wis. There are a number of other companies also found in the Thomas register from which Belleville springs are also available.

In another embodiment of the invention, the membrane spring 30 may have an outer diameter close to the holes 30b which expands as the end 30c is moved from right to left in FIGS. 1 and 1a. This increase in diameter would therefore bind the holes 30b against the studs 36, such that the holes 30c jam themselves against the studs 36 by the distortion of the membrane disc 30, and then lock themselves against the studs 36. A Belleville washer of this type could be a modification of the typical Belleville type membrane spring that is found in most manual transmissions, where the tangs or tabs or projections 40 from the outer end 30a of the membrane disc 30 where the tangs or tabs or projections 40 are connected together could be relatively narrow. That is, the outer diameter of the end and the basis of the tangs or projections or tabs is relatively small. That is to say that annular region that connects the projections which project inwardly towards end 30c of a membrane disc such as 30, is relatively thin so that when the ends 30c of the projections force the outer end 30a to expand outwardly.

The outer end 30 at its extreme upper end as shown in FIGS. 1 and 1a, could distort and the extreme outer diameter of the membrane spring 30 could therefore increase in diameter. An embodiment where such a membrane spring 30 could be utilized is disclosed in FIG. 2, to be described in more detail later.

By varying the thickness from one portion of the membrane spring 30 to another, varying the outer diameter and the inner diameter, varying the positions of the holes 30b, varying the structure of the membrane spring 30 along its length, and by restricting certain portions of the membrane spring 30, so that the diameter and distortions of the membrane spring 30 at selected portions do not expand and contract as if the spring were homogeneous throughout, also changing the dimensions and the taper of the tangs or projections which form the interior portion of the membrane spring 30, and also the holes at the bases of the tangs or projections or tabs could provide the required distortion of the membrane spring 30, especially at the end 30a. The characteristics of the membrane spring 30 can be changed so that the desired distortion of the outer end 30a and/or the dimensions and locations of the holes 30b change to a degree which will provide the jamming or grasping action which will hold the appropriate portion of the membrane disc 30 such as the outer end 30a is in an appropriate position during the engagement and the disengagement of the clutch friction linings 21.

In FIGS. 3–9, the outer diameter end of the membrane spring 30, at least in one sub-embodiment of each of the embodiments of FIGS. 3–8, the outer end of the membrane spring 30 distorts so that it grips studs or other guiding means.

In yet another embodiment of the invention with regard to especially FIGS. 1, 1a, and 2, as the membrane spring moves from its right position in FIG. 1, if for example, the tabs 40 are very stiff and the area about the periphery 38 of the membrane spring 30 is relatively weak, the outer end portion 30a will actually increase in diameter such that the holes 30b will grasp the studs 36. With regard to FIG. 2, the outer portion of the membrane spring 30 will expand to make contact with the portion 38 of the housing 11.

In yet a further embodiment of the invention, if the membrane disc is relatively thick such that the holes 30b, as shown in FIGS. 1 and 1a, are relatively long, and the angles of the longitudinal axes of the holes are disposed at an angle with respect to a perpendicular to the membrane disc 30, at the end 30a, when the membrane spring 30 is disposed to the right, the holes 30b will have their longitudinal axes substantially aligned with the longitudinal axes of the studs 36. Therefore permitting relatively free movement of the membrane spring 30 at its end 30a about the studs 36. However, when the lower end 30c of the membrane spring 30 moves to the left so that it is essentially in the position shown in FIGS. 1 and 1a, the upper end rotates such that the holes 30b no longer have their longitudinal axes aligned with the longitudinal axes of the studs 36, and the holes 30b bind upon the studs 36, thereby grasping the studs 36, and holding fast to the studs 36. This grasping of the studs 36 by the holes 30b permits a force to be transferred from the membrane disc 30 to the stops 25, and thereby engage the clutch disc 17 with the friction linings 21.

FIGS. 19–26 correspond to FIGS. 1–8.

As shown in FIG. 8, the membrane spring 32 is supported on the radial outside by means of the ring 42 on the clutch housing 11. The membrane spring 32 applies pressure on the radially inward portion of the membrane disc 30, in the form of an axial force which is directed towards the clutch disc 17. As a result of the the axial force generated by the membrane spring 32 on the membrane disc 30, the membrane disc 30 clamps on the axial guide 38. The membrane disc 30 thus transmits an axial force pressing the application plate 13 towards the clutch disc 17.

A lever is thereby formed which is effective between the membrane disc 30 and the projection 25 of the application plate 13. The lever as shown in FIG. 8 is such that the one lever arm extends radially outward from the extension of the membrane spring 32 to the membrane disc 30, to the point of contact between the membrane disc 30 and the application plate 13 (i.e., projection 25). This is shown as "L1" in FIG. 8. A second lever arm extends from the contact point between the membrane disc 30 and the application plate 13 (i.e., projection 25) to the clamping point of the membrane disc 30 on the axial guide 38. This is shown as "L2" in FIG. 8. On account of the long first lever arm L1 mentioned above which is, in this embodiment, located radially inside the contact point between membrane disc 30 and the application plate 13, a relatively small axial force applied by the membrane spring 32 suffices to generate the necessary axial force on the application plate 13. The lever ratio (i.e., the length of the first lever arm divided by the length of the second lever arm, i.e., L1/L2) therefore makes it possible to use a relatively weak membrane spring 32. This lever ratio is also apparent in the other FIGS. 2–8 as will be discussed subsequently.

In other words, FIG. 1 shows the membrane spring 32 that applies an axial force on the radially inward portion of the tabs 40 of the membrane disc 30. The membrane disc 30 is displaced axially towards a stop 25 of the application plate 13, compensating for the wear of the friction linings 21 as discussed previously. The membrane disc 30 is axially guided by axial guide 38. The application plate 13 then moves axially with the membrane disc 30 a relatively short distance until the friction linings 21 are engaged. Continued application of axial force by the membrane spring 32 on the membrane disc 30 causes a clamping connection between the membrane disc 30 and each stud 36 of the axial guide 38.

Because of the clamping connection between the membrane disc 30 and the studs 36, a "single lever arm" lever mechanism can thereby be created to engage the application plate 13 against the friction linings 21. Each clamping connection 34 between the membrane disc 30 and a stud 36 of the axial guide 38 effectively forms a fulcrum 34 of a lever mechanism, with each lever arm L1, L2 extending radially inward from the fulcrum 34. The first, or input, lever arm L1 extends from the fulcrum 34 radially inward to the contact point of the membrane spring 32 with the corresponding tab 40 of membrane disc 30. The second, or output, lever arm L2 extends from the fulcrum 34 radially inward to the stop 25 of the application plate 13. The first and second lever arms L1, L2 of the lever mechanism are disposed to form a lever arm ratio L1/L2 as discussed below.

Because the stop 25 is located radially outward from the contact point of the membrane spring 32 with the membrane disc 30, the first lever arm L1 is greater in length than the second lever arm L2 and hence the lever arm ratio L1/L2 is greater than one. Because the fulcrum point 34 is located near the radially outer end of the tab 40 and the membrane spring 32 near the radially inner end of tab 40, L1 can preferably be a substantial portion of the radial extent of the membrane disc 30. And, because the stop 25 of the application plate 13 can be formed radially inward of the axial guide 38, the lever arm ratio L1/L2 can be varied to meet particular needs.

The application of axial force by the membrane spring 32 to the corresponding tab 40 of the membrane disc 30 can be considered an input force of the lever mechanism to engage the application plate 13 against the friction linings 21. The reaction force generated by the corresponding tab 40 of the membrane disc 30 applied to the stop 25 of the application plate 13 can be considered an output force of the lever mechanism. Because the lever arm ratio L1/L2 is greater than one, an input force F applied by the membrane spring 30 is effectively multiplied or amplified by the lever arm ratio L1/L2 to generate a larger output force against the application plate 13. Because of the lever mechanism, a relatively weak membrane spring 30 can be used to generate a relatively large force on the application plate 13.

Figure 19:
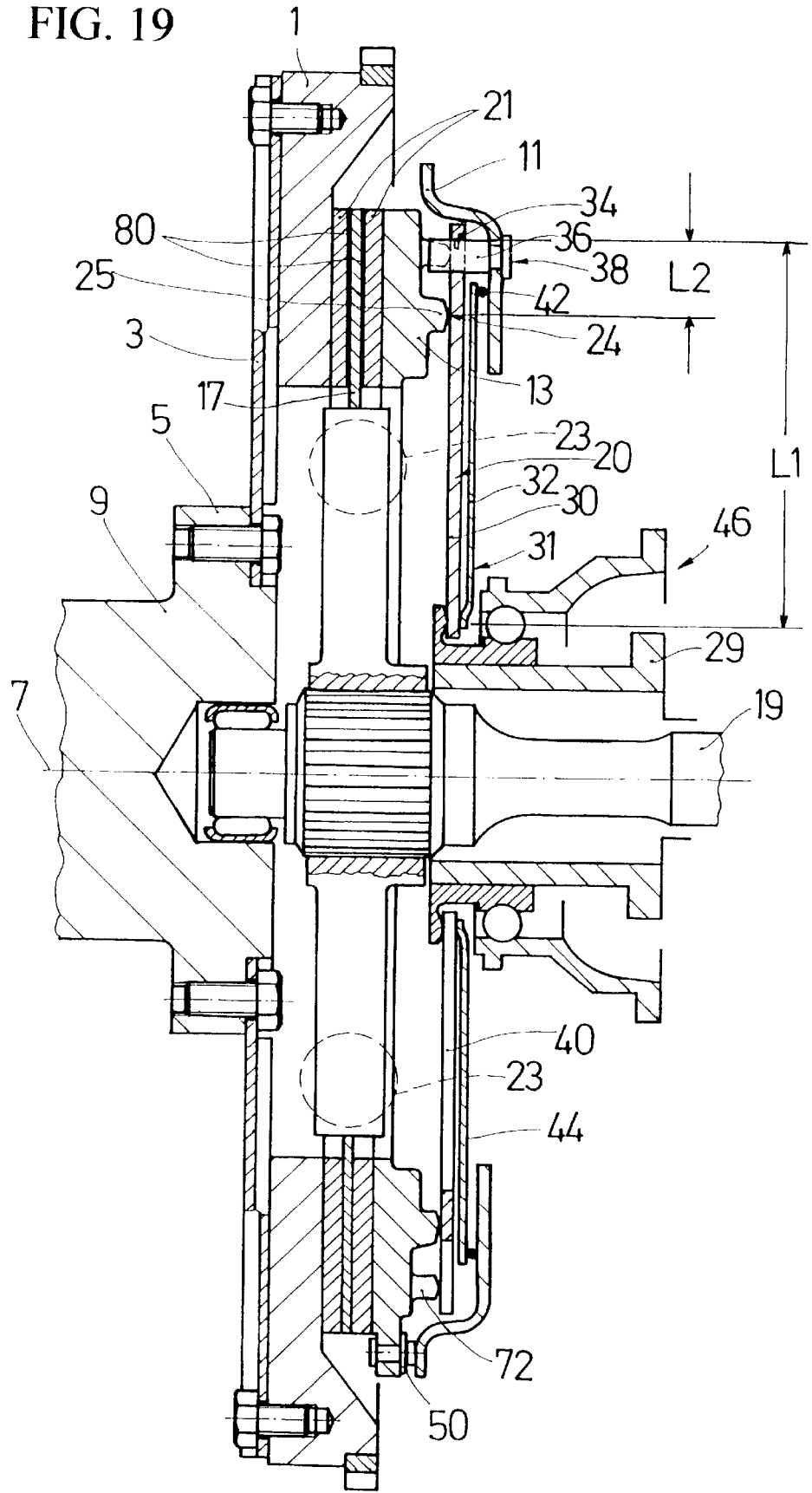
FIG. 19 is similar to FIG. 1 but includes additional reference numbers.

FIGS. 20–26 illustrate other possible embodiments of the lever mechanism shown in FIG. 19. These embodiments correspond to those shown in FIGS. 2–8. All of the embodiments include a "single lever arm" lever mechanism that can be axially guided to compensate for wear of the friction linings 21. Further, all of the embodiments shown include the input force acting essentially at or near the periphery of the membrane disc 30 to thereby substantially maximize the extent of the first lever arm length L1.

Figure 20:
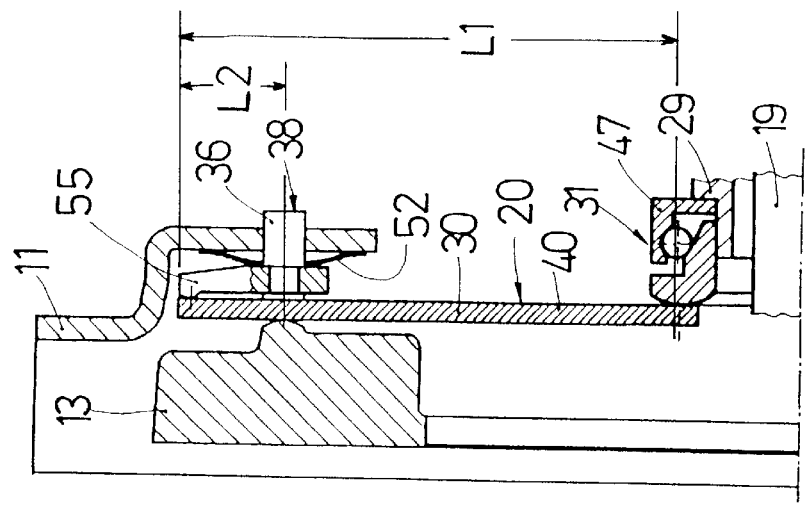
FIG. 20 is similar to FIG. 2 but includes additional reference numbers.

FIG. 20 illustrates another embodiment of the lever mechanism discussed above. However, the axial guidance 38 of the membrane disc 30 takes place in the radially outer area on a segment of the clutch housing 11 which runs axially. Consequently, the clamping of the membrane disc 30 occurs on the radially outermost surface of the membrane disc 30 against the clutch housing 11. The resulting fulcrum is therefore located at an end of the membrane disc 30, allowing for preferably longer lever arms L1 and L2.

Figure 21:
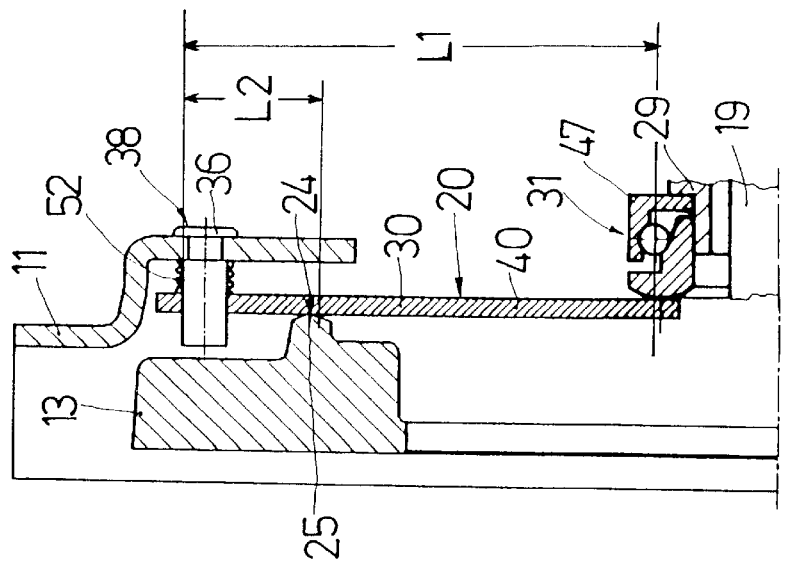
FIG. 21 is similar to FIG. 3 but includes additional reference numbers.

FIG. 21 is an additional embodiment of the lever mechanism similar in principle to the lever mechanism shown in FIG. 19. However, the engagement mechanism 47 acts as the application means 31 and the membrane disc 30 is biased against the shoulders 25 of the application plate 13 by springs 52 located on the studs 36 of the axial guide 38. The engagement mechanism 47 can therefore be considered to supply the input force F to lever arm L1 when the membrane disc 30 clamps against the studs 36 during engagement as previously described above.

Figure 22:
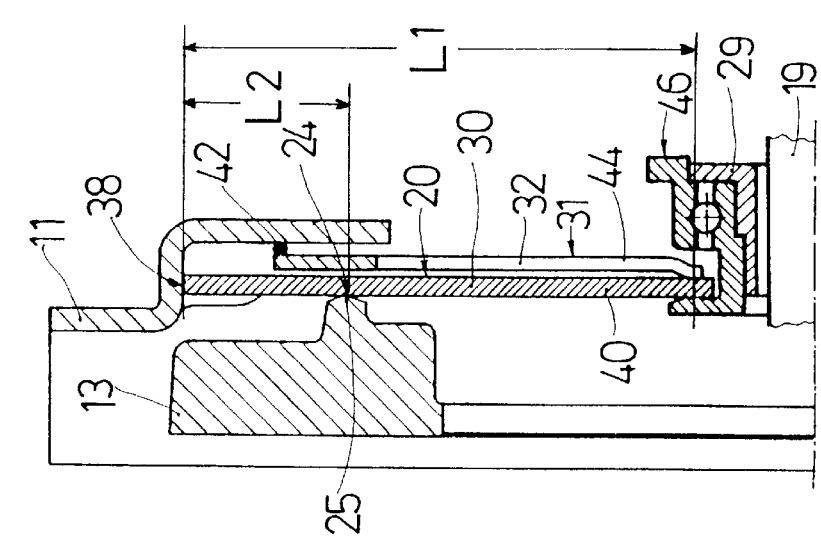
FIG. 22 is similar to FIG. 4 but includes additional reference numbers.

FIG. 22 is a further embodiment of the lever mechanism similar in principle to the lever mechanism shown in FIG. 21. The studs 36 are mounted so that they can move in the clutch housing 11. As described previously, the engagement mechanism 47 displaces the membrane disc 30 axially until an application force is applied. The axially movable studs 36 are thereby clamped by means of the levers 55 in the clutch housing 11. The fulcrum of the lever mechanism occurs with the support of the outer surface of the membrane disc 30 against a corresponding lever 55. As in the embodiment shown in FIG. 20, this allows the resulting fulcrum to be formed essentially at an end of the membrane disc 30, allowing for preferably longer lever arms L1 and L2.

Figure 23:
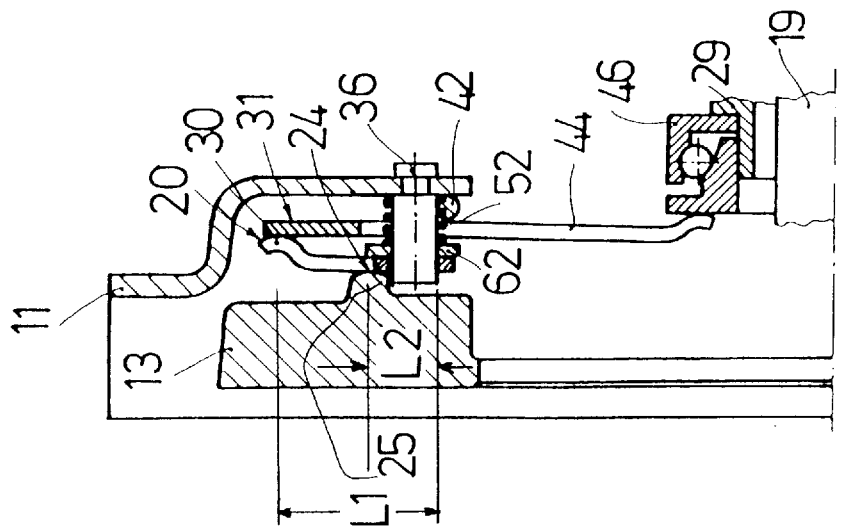
FIG. 23 is similar to FIG. 5 but includes additional reference numbers.

FIG. 23 is yet another embodiment of the lever mechanism. The membrane disc 30 extends radially inward only a portion of the distance to the release mechanism 46. The membrane spring 31 extends radially from the release mechanism 46 to the radially inward portion of the membrane disc 30 to supply the input force F. However, unlike the lever mechanism shown in FIG. 19, the distance L1 of the embodiment does not extend radially inward substantially from the axial guide 36 to the release mechanism 46, but extends radially inward some shorter distance. The operational aspects of the lever mechanism shown in FIG. 23 is essentially the same as the lever mechanism shown in FIG. 19, with the multiplication of the output force applied to the shoulders 25 of the application plate 13 to be increased by the ratio of the lever arms L1 and L2.

Figure 24:
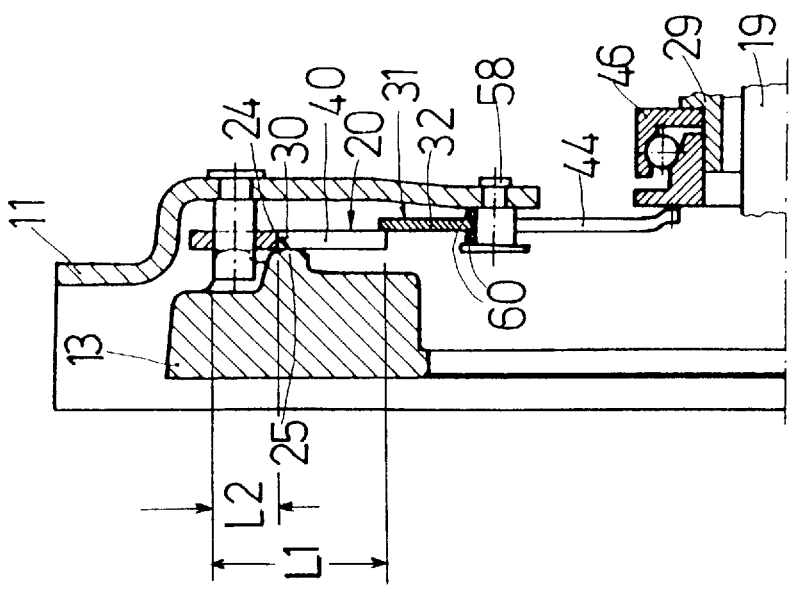
FIG. 24 is similar to FIG. 6 but includes additional reference numbers.

FIG. 24 is an additional embodiment of the lever mechanism. As shown, the lever mechanism is similar in principal to the lever mechanism shown in FIG. 23. However, rather than extending radially inward from the axial guide means 36 to receive the input force F, the membrane disc 30 extends radially outward from the axial guide means 36 to receive the input force F from the membrane spring 32. The operational aspects of the lever mechanism shown in FIG. 24 is essentially the same as the lever mechanism shown in FIG. 23, but the lever mechanism shown in FIG. 24 extends radially outward from the fulcrum rather than radially inward from the fulcrum as shown in FIG. 23.

Figure 25:
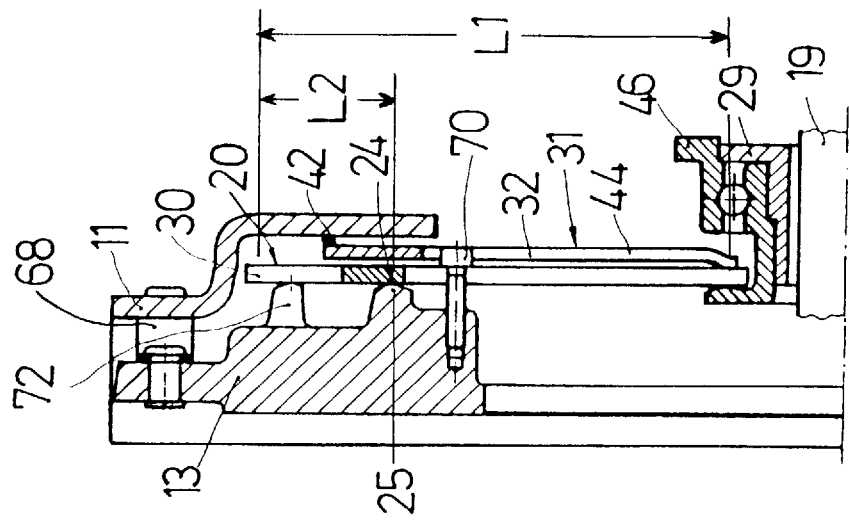
FIG. 25 is similar to FIG. 7 but includes additional reference numbers.

FIG. 25 is a further additional embodiment of the lever mechanism. As shown, the lever mechanism is similar in principal to the lever mechanism shown in FIG. 19 and discussed previously above. However, the axial guidance of the membrane disc 30 includes retaining means 70 acting in cooperation with energy storing devices 68 as previously described.

Figure 26:
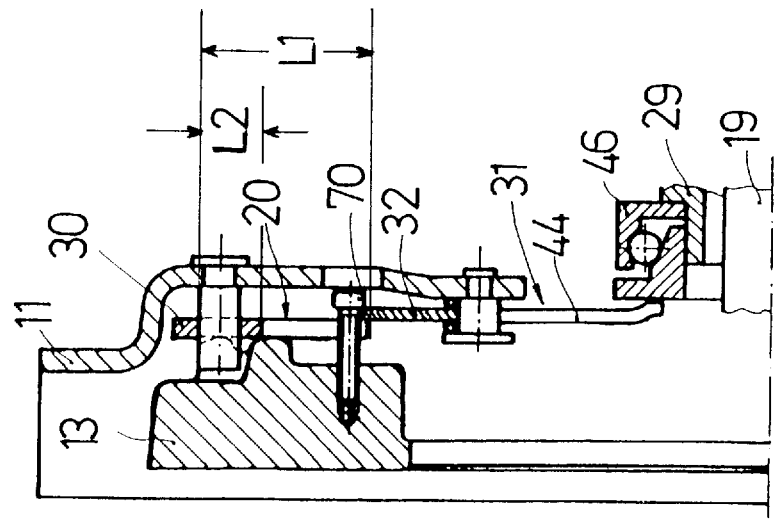
FIG. 26 is similar to FIG. 8 but includes additional reference numbers.

FIG. 26 is a yet additional embodiment of the lever mechanism. As shown, the lever mechanism is similar in principal to the lever mechanism shown in FIG. 23 and discussed previously above, but includes retaining means 70 acting in cooperation with an energy storing device 68 as previously described.

Figure 9:
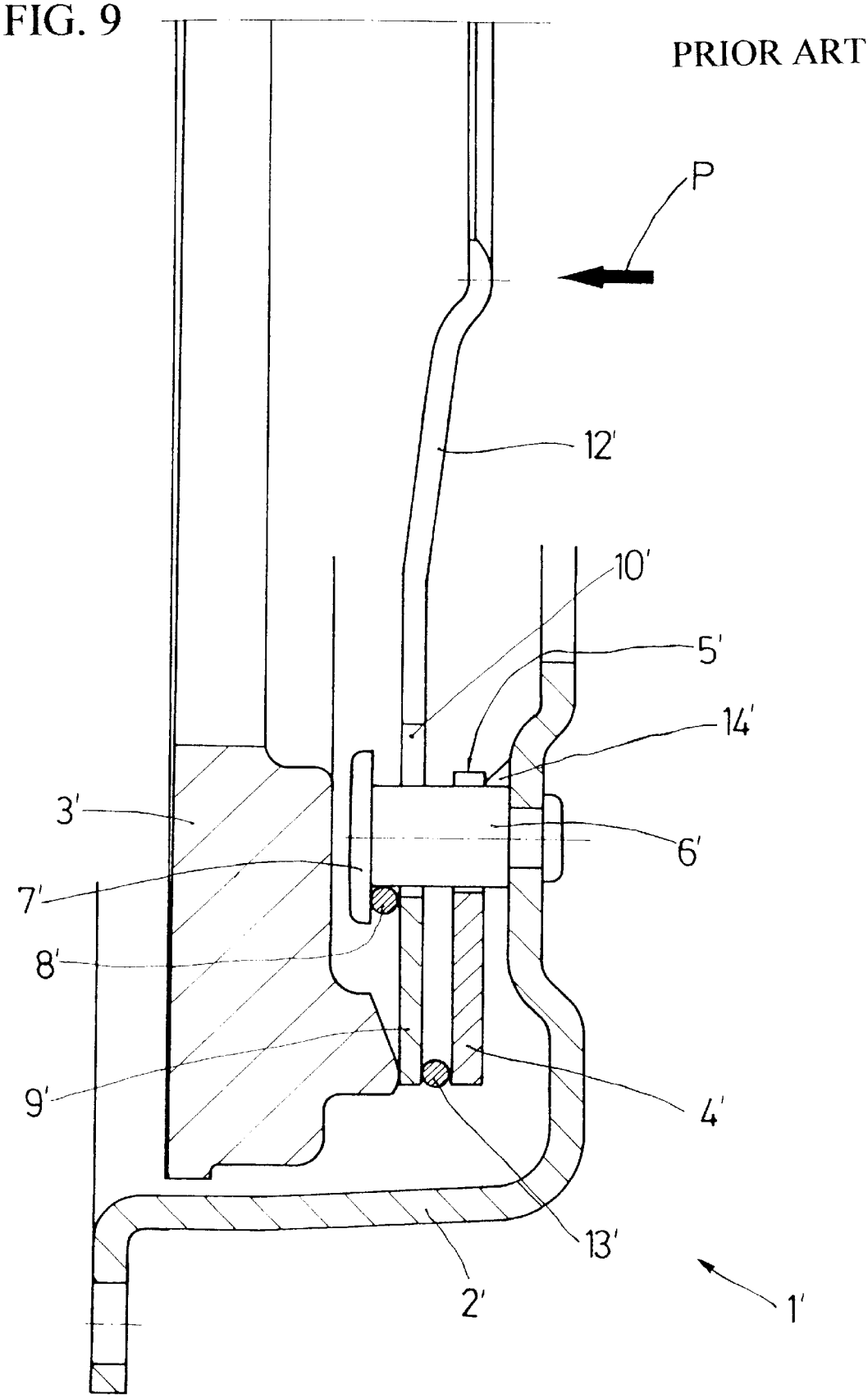
FIG. 9 shows the lower half of a longitudinal section through a friction clutch.

FIG. 9 is a schematic illustration of the construction of the friction clutch 1'. There is preferably a housing 2', which housing 2' is preferably bolted to a counterthrust plate (not shown), which counterthrust plate can preferably be in the form of a flywheel. Inside the housing 2' is a thrust plate 3', which thrust plate 3' is preferably connected to the housing 2' in a non-rotational but axially-movable manner. Such a non-rotational connection can be made, for example, by means of tangential leaf springs. Such a connection is well known in the art and will not be discussed further here.

Between the thrust plate 3' and the housing 2' are, on one hand, a cup spring 4' which, by means of an appropriate prestress in the vicinity of the outside diameter $D_4$ (see FIG. 9a) of the cup spring 4', preferably applies a force to the thrust plate 3' in the direction of a counterthrust plate (not shown in FIGS. 9 and 9a but which is shown in FIGS. 13–16 as indicated by reference numeral 16'), or in the direction as indicated by P. The cup spring 4' is also preferably in contact, in the vicinity of its inside diameter, with an abutment 14'. The abutment 14' is preferably located on the housing 2'. The cup spring 4' can preferably have, in a radially inner area, numerous notches 5' distributed on the circumference. The notches 5', to a certain extent, can preferably influence the spring characteristic of the cup spring 4'.

Several spacer bolts 6' are preferably located in the housing 2', and are distributed over the circumference of the housing, which spacer bolts 6' are preferably riveted into the housing 2'. The spacer bolts 6' preferably penetrate the cup spring 4' in the axial direction, namely in the vicinity of a corresponding notch 5'. The spacer bolts 6', preferably in an area close to the thrust plate 3', each preferably have a head 7'.

Figure 9A:
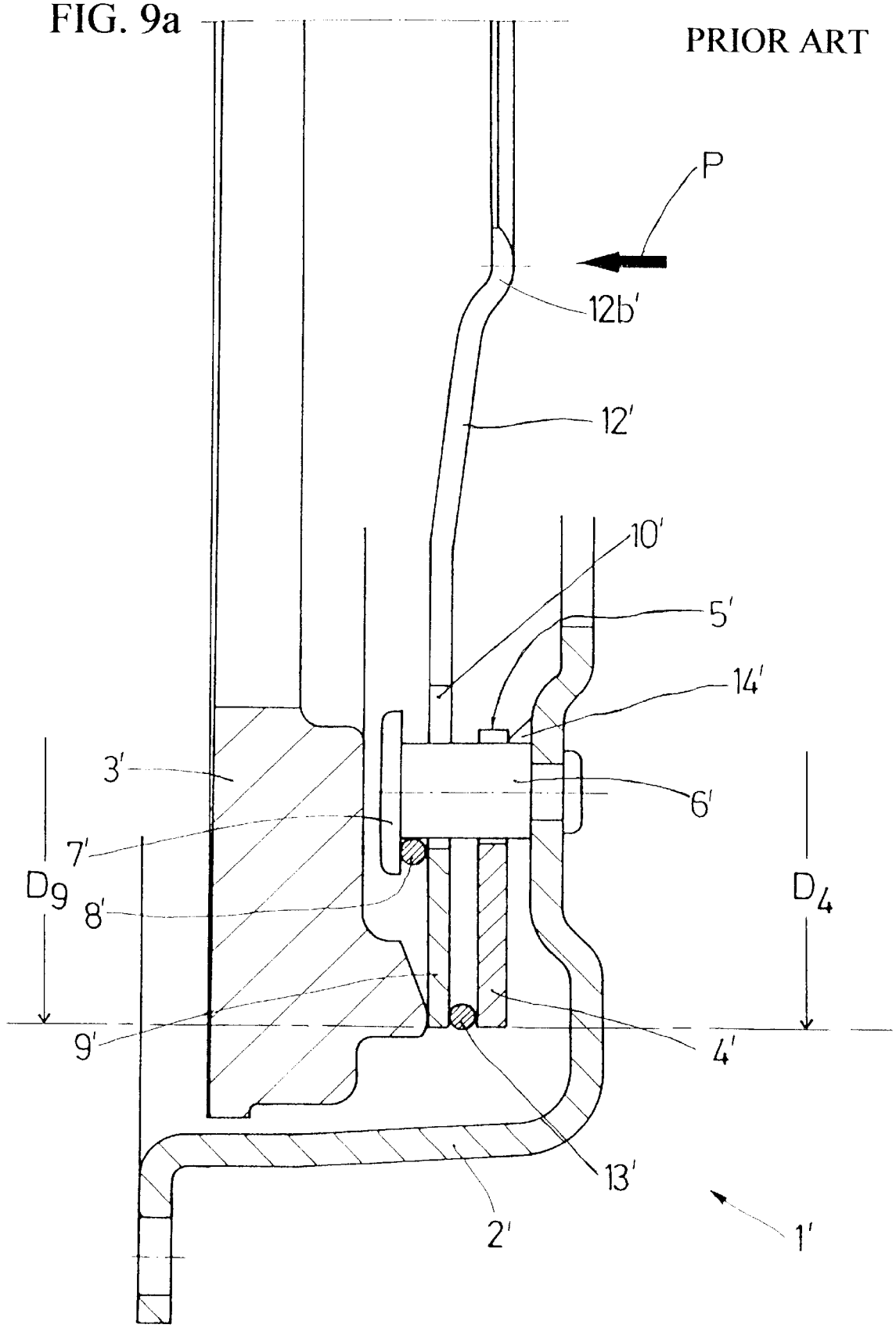
FIG. 9a shows substantially the same view as FIG. 9, but shows additional components.
Figure 10:
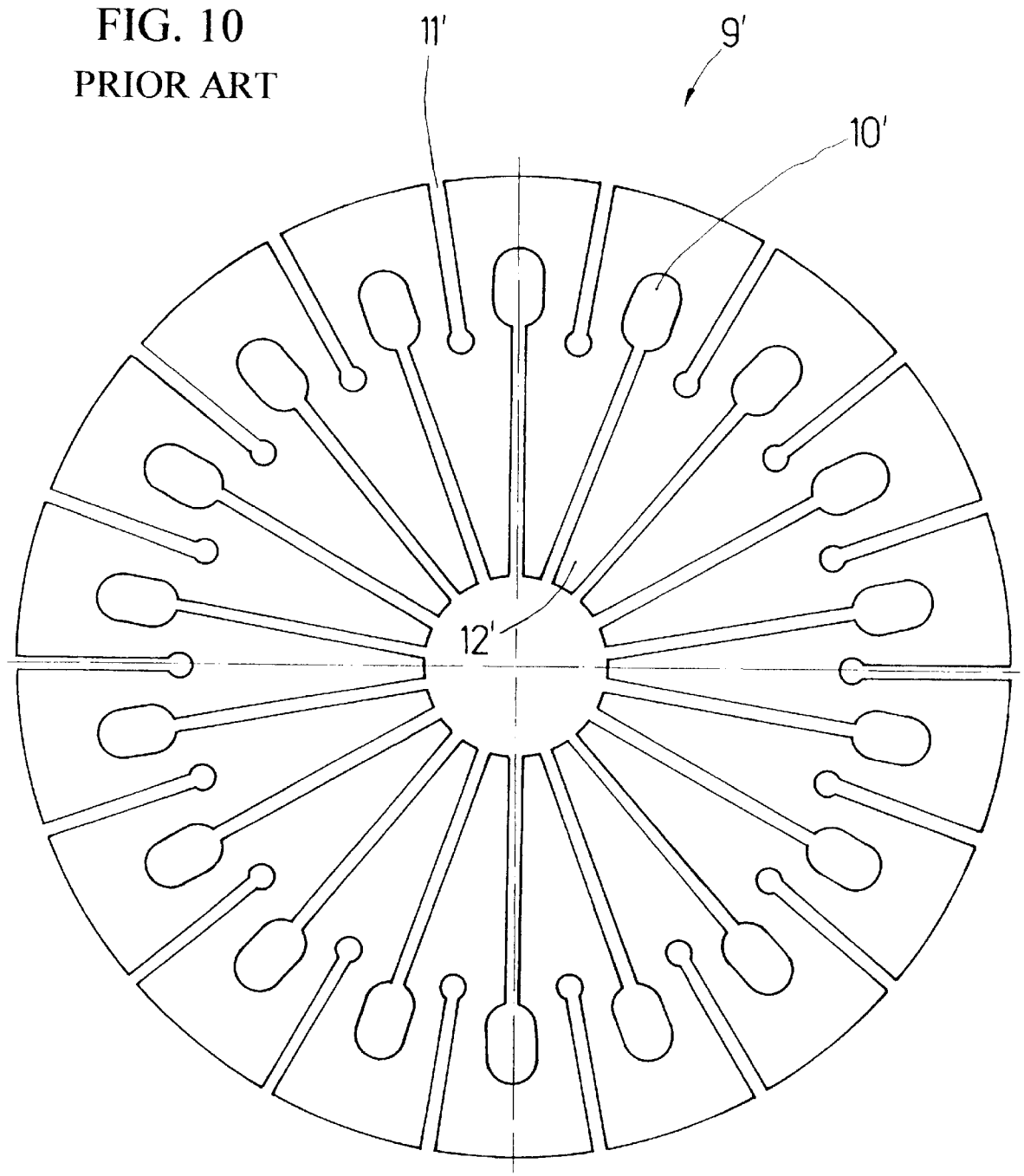
FIG. 10 shows a plan view of the clutch release element.

Preferably between the cup spring 4' and the thrust plate 3', there is a clutch release element 9', which clutch release element 9' is illustrated in a plan view in FIG. 10. The clutch release element 9', which may be used in an embodiment or embodiments of FIGS. 1–8, is preferably constructed in a manner similar to a membrane spring, and preferably has openings 10' distributed on the circumference, through which the spacer bolts 6' can preferably extend. The clutch release element 9', in the vicinity of the openings 10', is preferably supported in the axial direction, with the interposition of a wire ring 8', on the heads 7' of the spacer bolts 6'. The outside diameter $D_9$ (see FIG. 9a) of the clutch release element 9' is preferably approximately the same as the outside diameter $D_4$ of the cup spring 4', and between the two there is also a wire ring 13', which wire ring 13' preferably acts as a spacer or direct contact mechanism.

Radially inside the openings 10', the clutch release element 9' can preferably be provided with individual flexible tongues 12' which tongues 12' are preferably separated from one another circumferentially by corresponding slots 12a' (see FIG. 10a) which slots 12a' preferably run in the radial direction. The slots 12a' each can preferably terminate in an opening 10'. Starting from the outside diameter $D_9$ of the release element 9', there are slots 11' preferably running radially inward, which slots 11' preferably run between each two neighboring openings 10' and can preferably end approximately in the radial vicinity of the openings 10'.

It should be understood that the embodiment shown in FIGS. 9 and 9a can preferably have a surrounding structure similar to that shown in FIGS. 10 through 16.

The friction clutch 1' can preferably operate as follows: FIG. 9 shows the engaged state of the friction clutch 1'. The cup spring 4' can preferably be installed with prestress, so that the cup spring 4' is preferably in contact, in the vicinity of its inside diameter, with the abutment 14' on the housing 2'. In the vicinity of the outside diameter $D_4$ of the cup spring 4', preferably by means of the wire ring 13' and by means of the outside diameter $D_9$ of the clutch release element 9', the cup spring 4' preferably acts on the thrust plate 3', so that the thrust plate 3' is prestressed toward the counterthrust plate or possibly in a direction corresponding to P, so that a clutch disc (not shown in FIG. 9) is preferably braced between the thrust plate 3' and the counterthrust plate, and can be driven by friction.

The clutch release element 9' can preferably be installed with a slight prestress, so that as a result of the force of the cup spring 4', the clutch release element 9' is braced between the wire ring 13' and the thrust plate 3', and is held by means of residual stress against the wire ring 8' in relation to the heads 7' of the spacer bolts 6'. To release the friction clutch 1', a force in the direction of the arrow P can preferably be exerted on the ends 12b' (see FIG. 9a) of the flexible tongues 12', so that the clutch release element 9' can be tipped around a tipping circle, represented by the wire ring 8', so that the outside diameter $D_9$ of the clutch release element 9' preferably executes a motion essentially opposite to the direction of the arrow P to oppose the spring force of the cup spring 4' on the thrust plate 3' and thereby enable the wire ring 13' and the cup spring 4' to execute a releasing motion. The thrust plate 3' is thereby released from an axial prestress force, and can preferably release the clutch disc. The clutch engagement process takes place in the reverse direction, or essentially by releasing pressure P so that cup spring 4' can thereby reengage the thrust plate 3' with the counterthrust plate.

Figure 11:
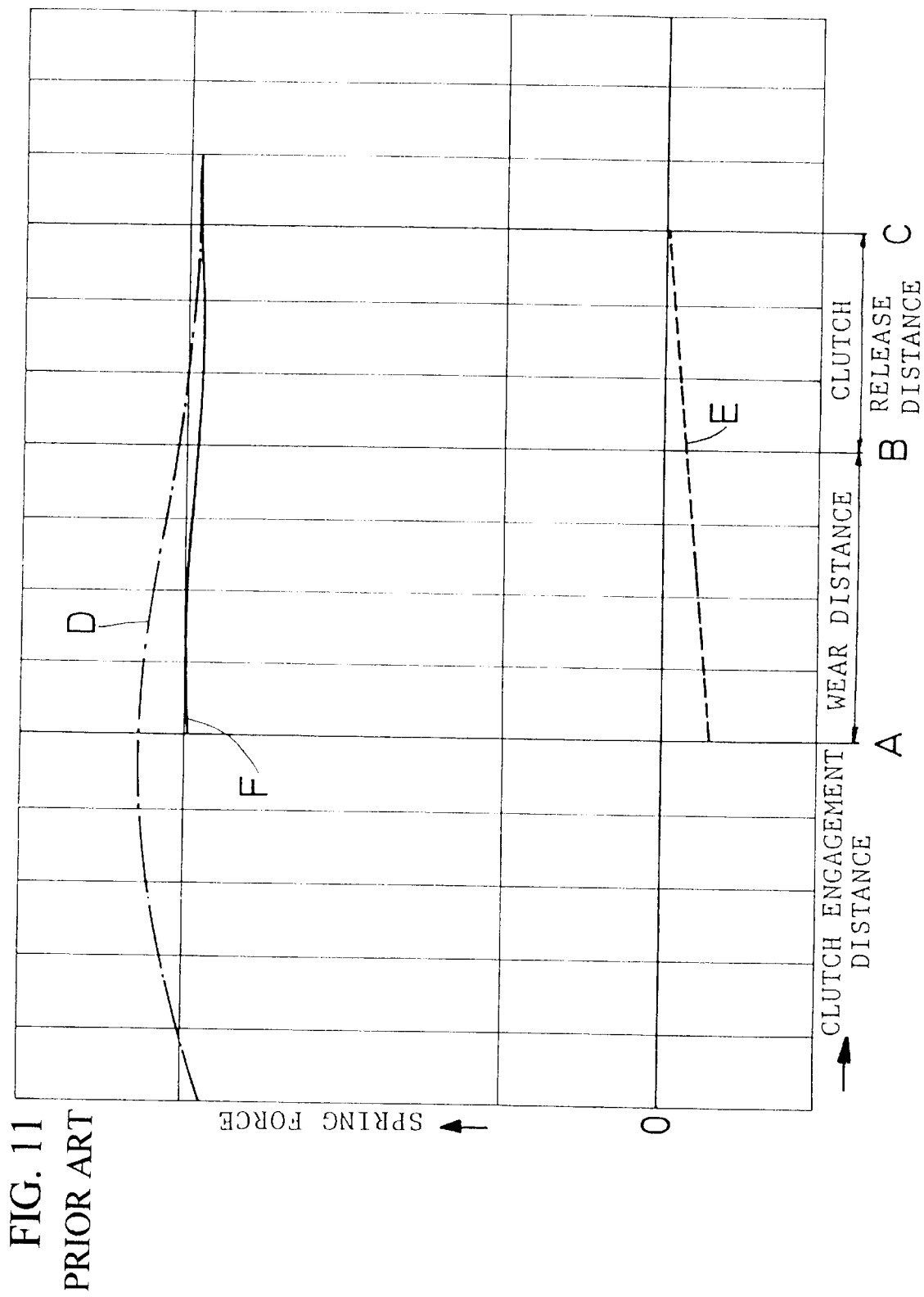
FIG. 11 shows the characteristic force curve of the individual parts as well as the overall characteristic force curve.

FIG. 11 shows how the clutch engagement and release motions are executed in terms of the forces involved. In the illustrated diagram shown in FIG. 11, the spring force is plotted over the actuation distance of the thrust plate 3', or the clutch engagement distance. It is thereby apparent that the characteristic E of the clutch release element 9' runs from Position C corresponding to the released state, in which the prestress is essentially 0, into the negative force area. The curve of characteristic E is essentially linear. The curve of characteristic E then adjoins the clutch release distance, which runs from Point C toward Point B for a large wear distance, and which eventually runs to Point A. Over the entire actuation distance, which is a combination of the clutch release distance and the wear distance, the spring characteristic D of the cup spring 4' preferably runs in the manner of clutches used in the past, so that in the engagement direction, the spring force increases slightly, and reaches the highest point approximately in the vicinity of the maximum wear distance at Point A, and then the spring characteristic typically descends again. Thus, the curve of the spring characteristic D of the cup spring 4', in accordance with at least one embodiment of the present invention, can be essentially non-linear. As a result of the curve of characteristic E of the clutch release element 9', which runs essentially opposite to the spring characteristic D, there is an overall characteristic F which runs practically horizontally, and which makes it possible to realize an essentially constant application force on the clutch disc essentially over the entire wear distance.

Figure 10A:
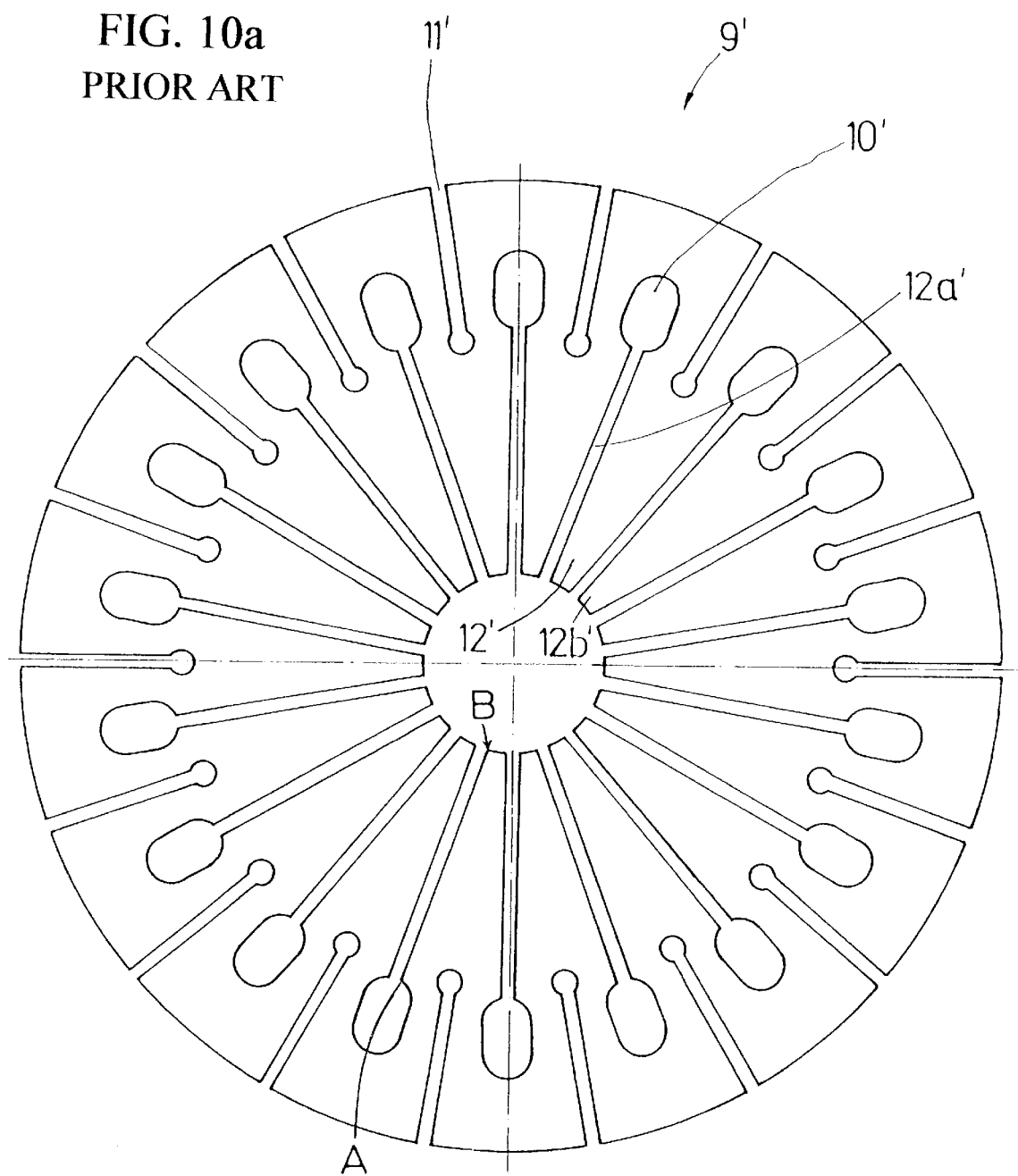
FIG. 10a shows substantially the same view as FIG. 10, but shows additional components.

A friction clutch equipped in this manner described above can therefore be tuned very accurately to the maximum torque to be transmitted, and need not work with a greater safety margin for safety reasons. In addition to the simple basic construction, such a clutch can also have a relatively small overall or compact construction. The tuning of the characteristic of the clutch release element 9' should therefore be made so that when the friction clutch 1' is fully disengaged at Point C, the prestress is essentially eliminated, as shown by the characteristic curve E (intersection with the base line at C). In other words, by forming the clutch release element 9', as best shown in FIGS. 10 and 10a, to have about 18 slots 11' and about 18 tongues 12', and by placing the slots 11' and the tongues 12' in an alternating fashion, the prestress of the clutch release element 9' should essentially be eliminated when the friction clutch 1' is fully disengaged. It is important that the clutch release element 9', when the clutch 1' is engaged and also over the entire wear distance, is held by residual stress on the heads 7' of the spacer bolts 6', so that a second support for the clutch release element 9' is essentially unnecessary.

Thus, the negative force exerted by the clutch release element 9' can, in accordance with at least one embodiment of the present invention, balance out the positive force of the cup spring 4' over essentially the entire wear distance, in order to keep the application force essentially constant over the entire life of the clutch.

In accordance with an alternative embodiment of the present invention, the curve of the spring characteristic of the cup spring 4' may be linear, while the curve of the spring characteristic of the clutch release element 9' may be non-linear, with one being positive and one being negative. Thus, the two forces can balance one another out, and preferably result in an essentially constant application force.

In accordance with another alternative embodiment of the present invention, the curve of the spring characteristic of the cup spring 4' and the curve of the spring characteristic of the release element 9' could both be linear, one being positive and the other negative. Thus, the two forces can balance one another out.

In accordance with yet an additional embodiment of the present invention, the curve of the spring characteristic of the cup spring 4' and the curve of the spring characteristic of the release element 9' could both be non-linear, one being positive and the other negative. Thus, the two forces can balance one another out.

Figure 12:
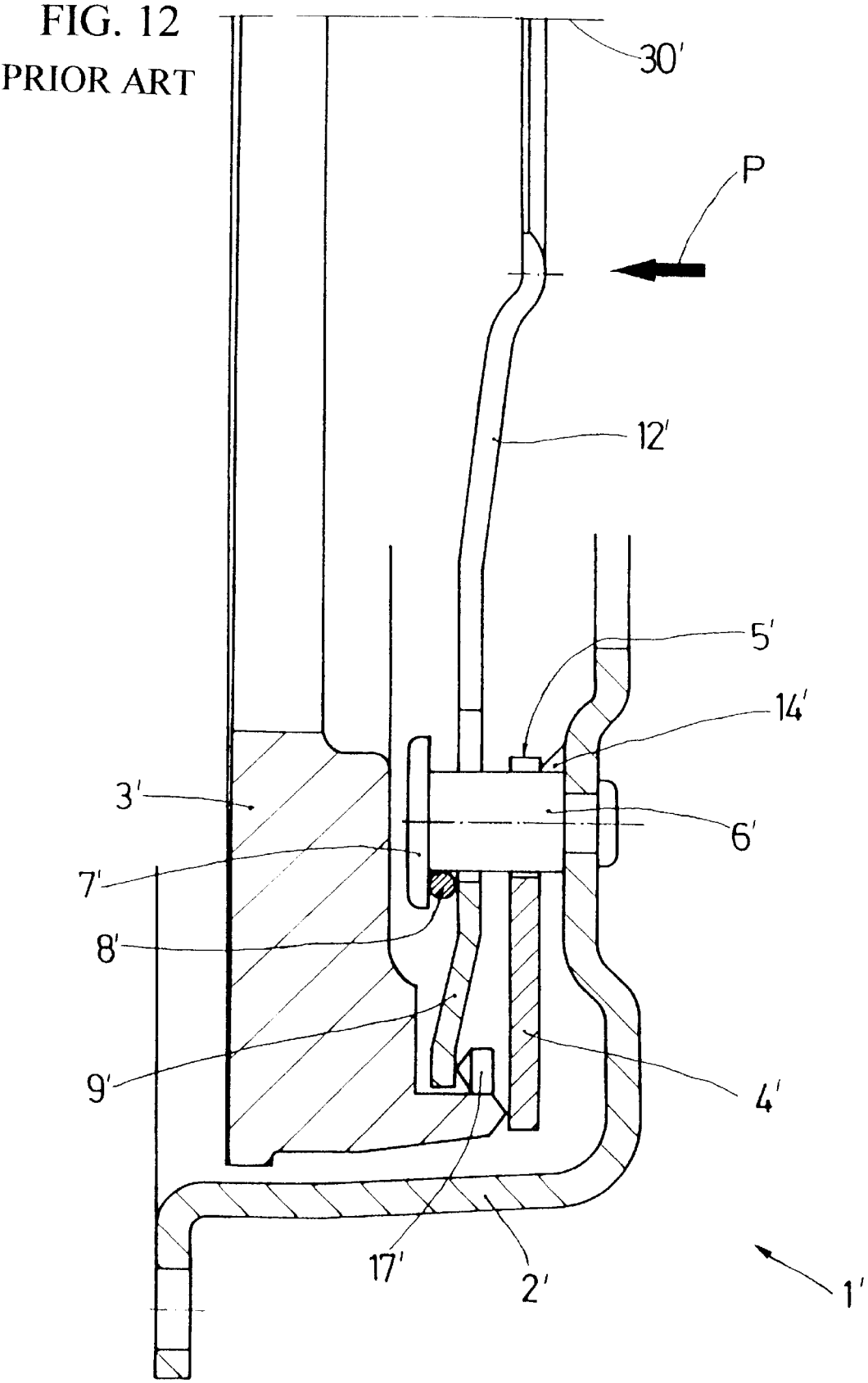
FIG. 12 shows a variant of FIG. 9.
Figure 12A:
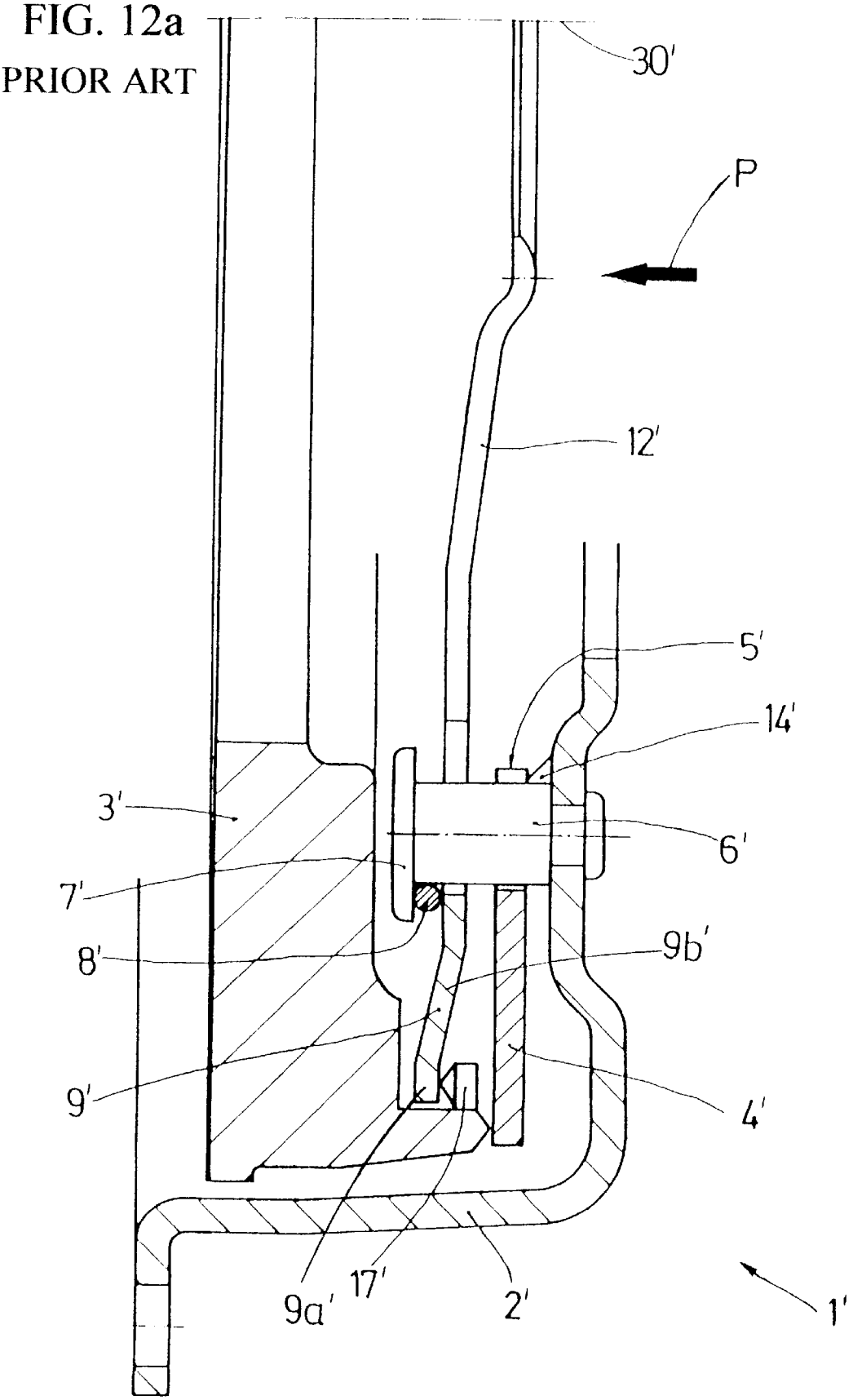
FIG. 12a shows substantially the same view as FIG. 12, but shows additional components.

FIGS. 12 and 12a illustrate a variant of FIG. 9. In contrast to FIG. 9, FIG. 12 illustrates a friction clutch 1' in which the cup spring 4' preferably acts directly on the thrust plate 3', and the clutch release element 9' also preferably acts directly on the thrust plate 3', namely at another point. In the outside diameter regions 9a' (see FIG. 12a) of the clutch release element 9', between the latter and the thrust plate 3', and preferably between the clutch release element 9' and the cup spring 4', there can preferably be a wear compensation device 17' which can essentially guarantee that, with increasing wear of the friction linings of the clutch disc (not shown in FIGS. 12 and 12a), and with the corresponding movement of the thrust plate 3' away from the spacer bolts 6', the position of the clutch release element 9' can essentially remain constant in relation to the clutch housing 2' and the spacer bolts 6'. The essentially unchanged position of the clutch release element 9' in turn essentially guarantees that even in the event of increasing wear of the friction linings, the characteristic E of the clutch release element 9' will essentially remain in the position illustrated in FIG. 11.

In accordance with the embodiment of the clutch 1' illustrated in FIGS. 12 and 12a, the clutch release element can preferably have an angled portion 9b' (see FIG. 12a) which preferably extends slightly towards the thrust plate 3'.

The wear compensation device 17' can preferably be positioned, in at least one embodiment of the present invention, between the clutch release element 9' and the cup spring 4' and the wear compensation device 17' can preferably be attached to the thrust plate 3'. With such a device 17', the cup spring 4' preferably directly moves the thrust plate 3', and not the release element 9', as was the case in the embodiment shown in FIGS. 9 and 9a.

With regard to the embodiments illustrated in FIGS. 9–12a, when the clutch pedal inside the motor vehicle is depressed by the operator, the prestress on the clutch release element 9' preferably decreases so little force is needed to keep the clutch disengaged (i.e. when the pedal is completely depressed), thus making operation of the clutch easier for the operator, especially during traffic when frequent stopping and starting is necessary.

It is to be understood that the embodiment of the friction clutch 1' shown in FIGS. 12 and 12a can preferably have surrounding structures similar to that shown in FIGS. 13 through 16.

A variant of a friction clutch 1' is illustrated in FIGS. 13 to 16. The structure of the embodiment of the present invention illustrated in FIGS. 13 through 16 will be described immediately herebelow. A more detailed description of the embodiment shown in FIG. 13 will be presented further below.

Figure 14:
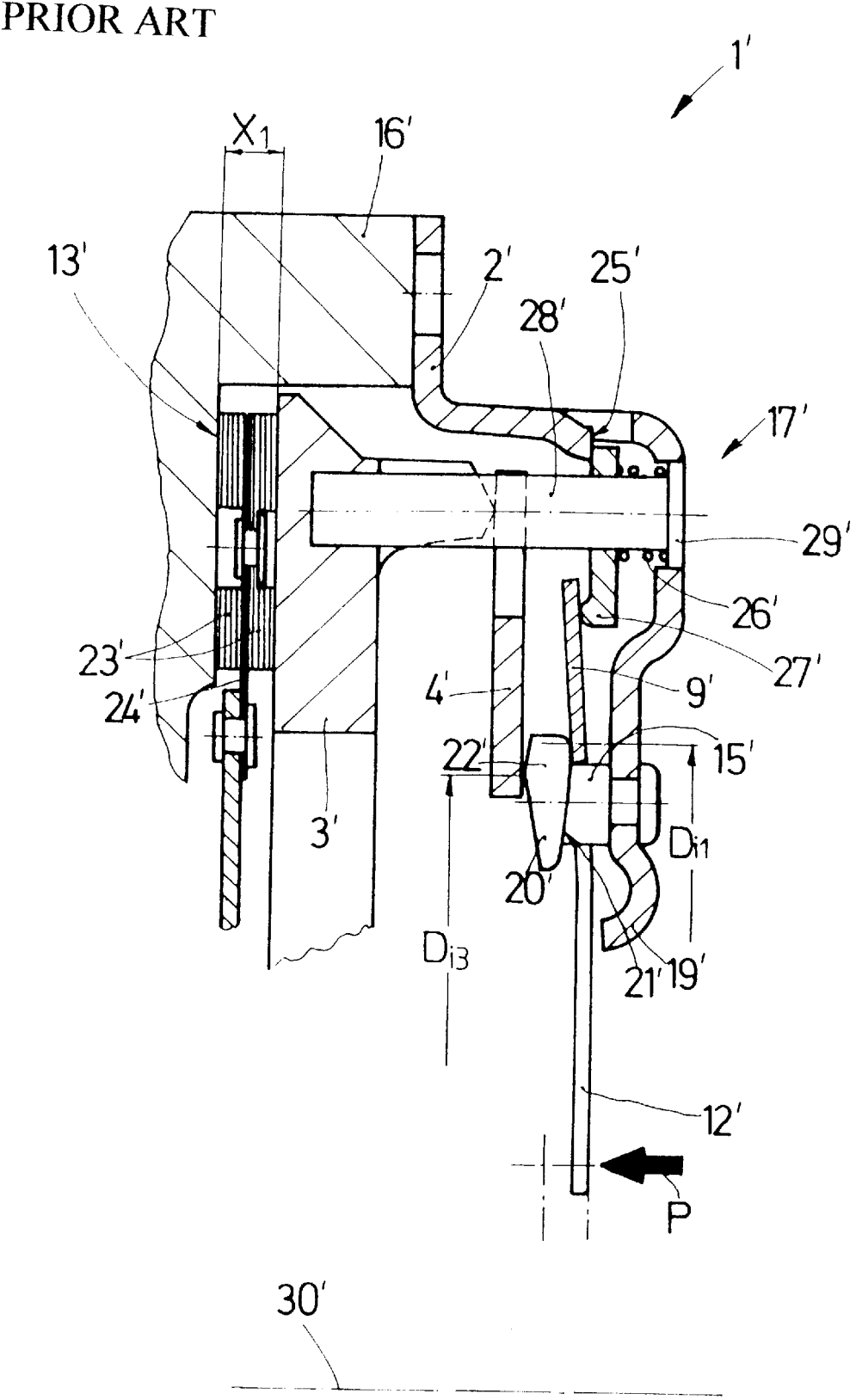
Figure 14A:
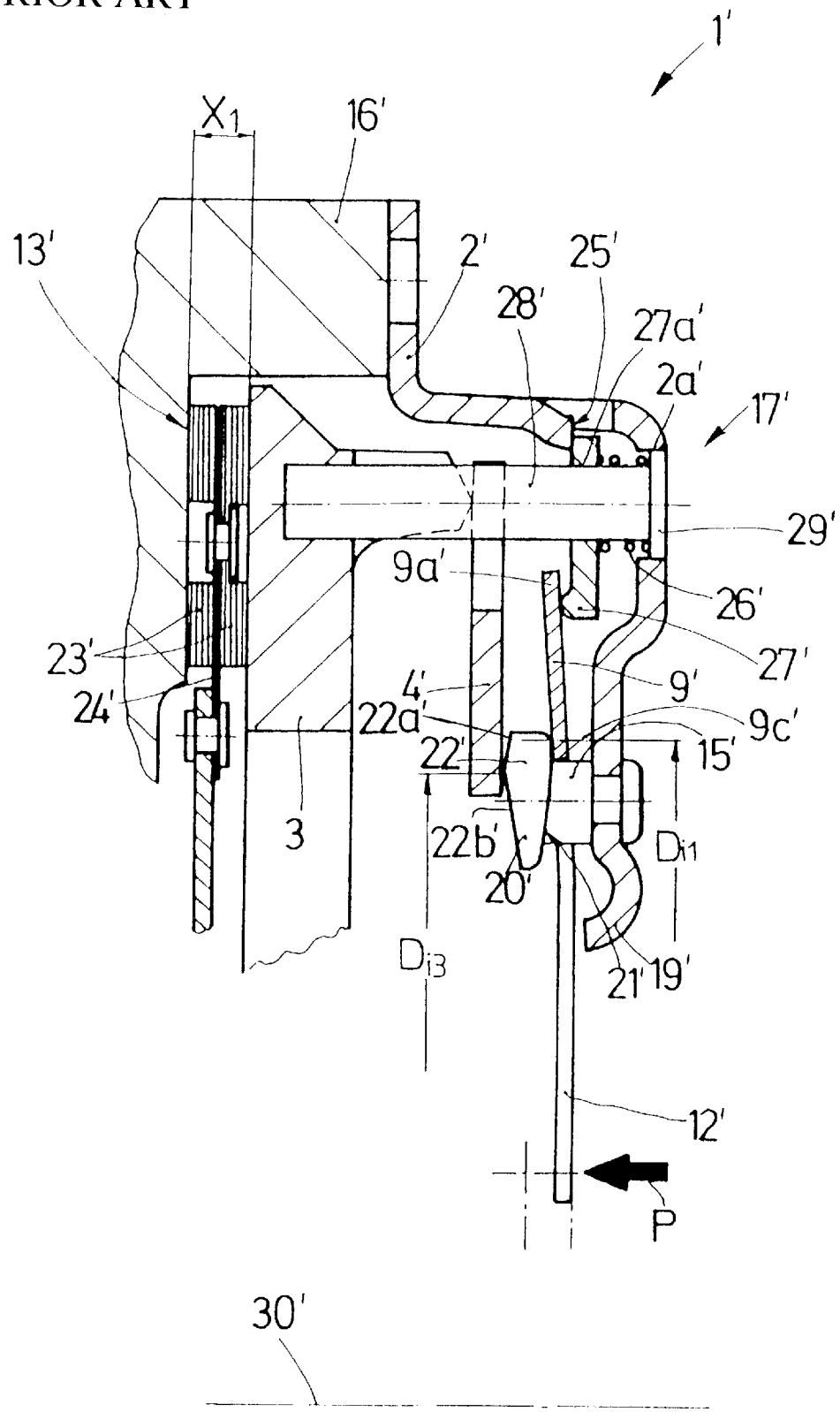

As shown in FIGS. 14 and 14a, the clutch housing 2' is preferably fastened to the counterthrust plate 16', which counterthrust plate 16' is preferably in the form of a flywheel. Between two friction surfaces axially opposite one another of the counterthrust plate 16' and the thrust plate 3', there preferably is a clutch disc 13' with spring segments 24' and friction linings 23'. The thrust plate 3' is preferably non-rotationally but axially movably mounted in the clutch housing 2'. The mounting of the thrust plate 3' in the housing 2' can be accomplished, for example, by means of tangential leaf springs (not shown). Such a mounting is well known in the art and will not be discussed further here.

The thrust plate 3' is preferably pushed by means of a cup spring 4' toward the counterthrust plate 16', whereby the cup spring 4' can preferably be supported near its outside diameter on the thrust plate 3', and with its inside diameter on the heads 20' of spacer bolts 15'. The spacer bolts 15' are preferably fastened concentrically about the axis of rotation 30' in the clutch housing 2'. To support the cup spring 4', the heads 20' preferably have bearing areas 22', which bearing areas 22' preferably extend in the direction of the thrust plate 3'. In accordance with at least one embodiment of the present invention, there can preferably be angled surfaces 22a' and 22b' (see FIG. 14a) immediately adjacent the bearing areas 22'. The cup springs 4' are preferably in contact with the bearing areas 22' primarily due to prestress applied from the direction of the thrust plate 3'. The heads 20' of the spacer bolts 15' can also preferably have a contour 21', which contour 21' preferably faces away from the thrust plate 3', which contour can preferably serve as a bearing surface for the clutch release element 9'.

The clutch release element 9' is preferably located between the clutch housing 2' and the heads 20' of the spacer bolts 15', whereby the spacer bolts 15' preferably extend through corresponding openings 9c' (see FIG. 14a) in the clutch release element 9'. The clutch release element 9' preferably extends radially inward by means of flexible tongues 12' to a clutch release system. The clutch release system is not shown but is well known in the art and will not be further described here. The flexible tongues 12' preferably extend radially outward to an actuation device (described in further detail herebelow) for actuating the thrust plate 3'. The bearing diameter for the cup spring 4' is designated Di3, and the bearing diameter between the clutch release element 9' and the contour 21' is designated Di1. The actuation device for the thrust plate 3' can generally include several bolts 28', which bolts 28' are preferably located concentrically about the axis of rotation 30'. The bolts 28' preferably extend in a direction parallel to the axis of rotation 30, and also preferably extend axially toward the clutch housing 2'. In the present embodiment, the bolts 28', in their terminal areas with their heads 29', preferably extend through corresponding openings 2a' (see FIG. 14a) in the clutch housing 2'. On these bolts 28', levers 27' are preferably mounted to permit axial movement, which levers 27' can preferably transmit the release force from the release element 9' by tilting the levers 27' to engage the levers 27' with the bolts 28', and then moving the bolts 28'. For this purpose, opening 27a' in the levers 27' are preferably designed so that the opening 27a' preferably approximately correspond to the diameter of the bolts 28'.

In the engaged position shown in FIGS. 14 and 14a, the clutch release element 9' is preferably in contact with the individual levers 27' with a slight prestress, so that the levers 27' are preferably clamped in relation to the corresponding bolt 28' and simultaneously, each of the levers 27', at an end opposite the contact with the clutch release element 9', is preferably in contact with a housing stop 25', which housing stop 25' is preferably rigidly fastened to the housing 2'. There can also be a spring 26' between the head 29' of each bolt and the corresponding lever 27', which spring 26' essentially provides a constant slight pressure on the lever 27', preferably in the direction of the thrust plate 3'.

The basic operation of the friction clutch 1' illustrated in FIGS. 14 and 14a preferably is as follows:

The thrust force for the frictional clamping of the clutch disc 13' is preferably applied by the cup spring 4'. The cup spring 4' can preferably be supported on one hand on the heads 20' of the spacer bolts 15', and thus on the clutch housing 2', and on the other hand directly on the thrust plate 3'. The spring force curve of such a cup spring 4' can be designed so that the curve is very flat over essentially the entire actuation distance and also over essentially the entire wear distance, as shown for example in FIG. 3 and in FIG. 17, which will be explained in further detail below. The clutch release element 9' can preferably be used to actuate or disengage the friction clutch 1'. By means of a clutch release system (not shown) and a clutch release bearing (not shown), both of which are well known in the art and will not be discussed further here, a force P can be applied to the ends of the flexible tongues 12', preferably in the direction of the thrust plate 3'. The release element 9' can thereby preferably be tilted about the head 20' of bolts 15' around a middle diameter Di1, so that the radially outer portion 9a' (see FIG. 14a) of the release element 9' preferably exerts a releasing force, by means of the lever 27' preferably clamped about the bolts 28', on the thrust plate 3'. The outside diameter, or the radially outer portion 9a, of the release element 9' thus executes an axial movement together with the levers 27', the bolts 28' and the thrust plate 3', preferably away from the clutch disc 13' and opposite to the direction of the arrow P. Thus, the friction clutch 1' is put into a released state and the clutch disc 13' is preferably free.

The engagement process of the friction clutch 1' can preferably take place in the opposite direction of that described immediately above. In that case, the release element 9' can preferably be designed similar to a membrane spring, and can itself preferably exert a spring force on the parts with which it is in contact. This spring force of the release element 9' is defined so that in the engaged state illustrated in FIGS. 14 and 14a, the release element 9' preferably exerts a slight releasing force on the thrust plate 3', so that the release element 9', during operation of the engaged friction clutch, is preferably held in essentially continuous contact with the levers 27' on one hand, and with the heads 20' of the spacer bolts 15' on the other hand. The release element 9' can also be designed so that with an increasing release distance, possibly due to wear of the friction linings 23', the release element 9' applies a greater releasing force, and thus can partly compensate for the force exerted by the cup spring 4'. In this manner, the required actuation force for the friction clutch 1' can be significantly reduced.

Further, when the clutch pedal is depressed by the operator of the motor vehicle, the spring 26' is preferably compressed more and more, thus exerting more force on the release element 9', so that much force is needed to hold the clutch in a disengaged position. This type of characteristic could possibly be advantageous in a high performance car, such as a race car, where a more rapid engagement of the clutch is desirable.

The wear compensation device 17' illustrated in FIGS. 14 and 14a can preferably operate as follows:

In the engaged state illustrated in FIGS. 14 and 14a, and when the friction clutch 1' is new, each lever 27' is preferably brought into contact with the housing stop 25'. This can be done, for example, by means of the spring 26', if the clutch release element 9' is released briefly from its contact with the lever 27'. If the levers 27' are in the illustrated position, the clutch release element 9' preferably exerts a low releasing force, so that the levers 27', with their opening 27a', are preferably tipped in relation to the bolts 28' to thereby become essentially clamped to the bolts 28', so that the levers 27' can thus transmit a releasing force to the bolts 28', and thus to the thrust plate 3'. If, during a startup, there is wear to the friction linings 23', then the next time the friction clutch 1' is engaged, each of the levers 27' will typically come into premature contact with the housing stop 25', although the thrust plate 3' has not yet clamped the friction linings 23'. The dimension $X_1$ illustrated in FIGS. 14 and 14a has essentially become smaller, due to wear of the friction linings 23'. The force of the cup spring 4' will essentially guarantee that the levers 27' come into contact with the housing stop 25', then upon further movement of the thrust plate 3' toward the linings 23', the levers 27' will essentially no longer be in a tilted configuration about bolts 28', and the clamping force between the levers 27' and the bolts 28' would be briefly eliminated. At this point, the thrust plate 3' can preferably clamp the friction linings 23', and the relative position between the bolts 28' and the levers 27' can be changed by the extent of the wear. It can thereby be essentially guaranteed that during the disengagement of the thrust plate 3', as the wear of the friction linings 23' increases, the levers 27' will preferably retain their position in relation to the clutch housing 2', whereupon the position of the clutch release element 9' is also preferably retained inside the clutch housing 2'. Thus, the originally defined spring force which is preferably exerted by the release element 9' on the clutch 1' can also be retained, so that the reduction of the clutch release force essentially remains constant in spite of wear.

Figure 17:
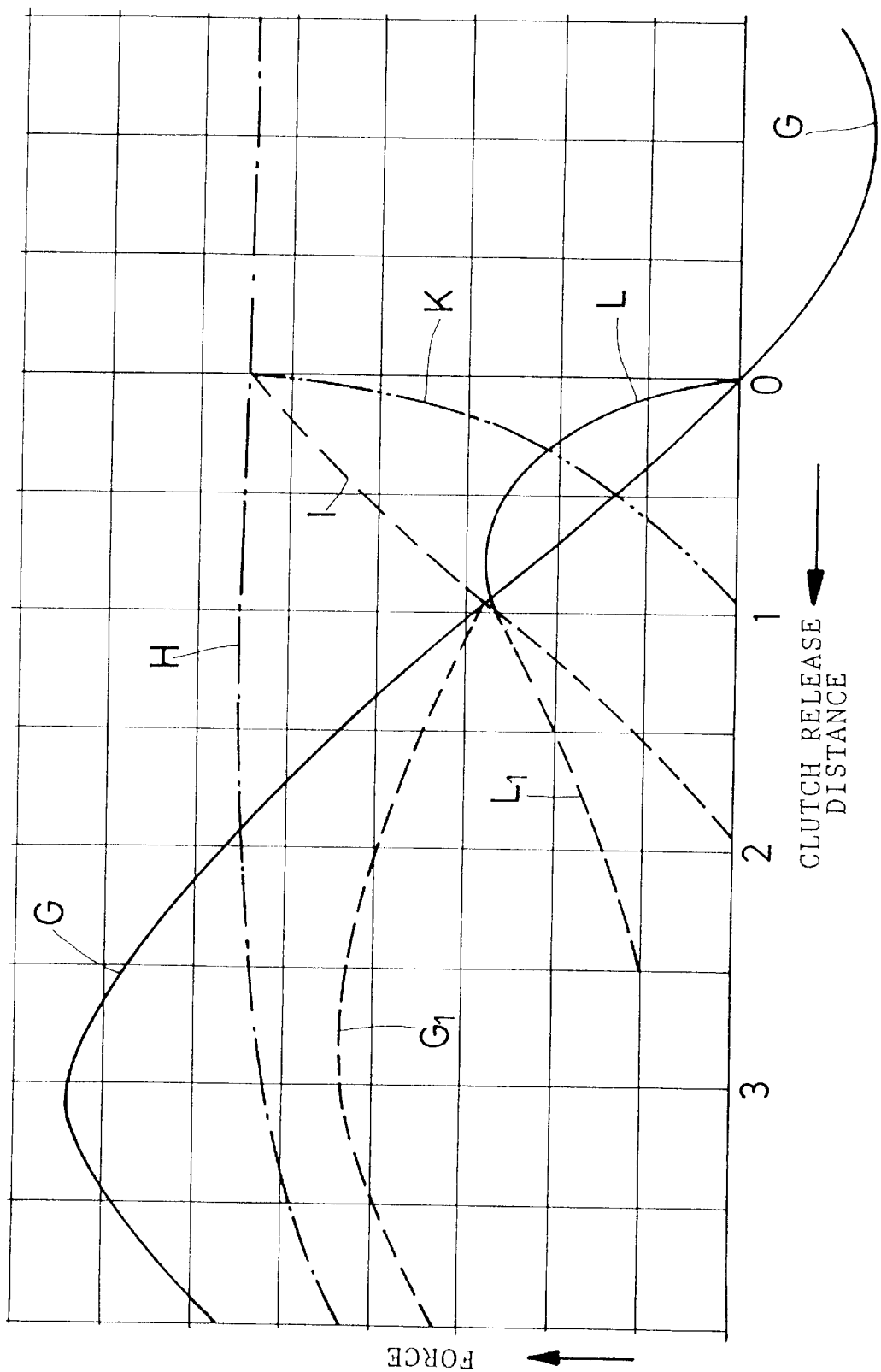
FIG. 17 shows the characteristic force curve of the individual parts and the overall characteristic of FIGS. 13 to 16.

FIG. 17 will be discussed now with regard to its relevance to FIGS. 14 and 14a. FIG. 17 shows the spring forces as a function of the clutch release distance. The engaged state of the friction clutch 1', as illustrated in FIGS. 14 and 14a, corresponds essentially to the release distance 0. The spring characteristic H is preferably generated by the cup spring 4', and is practically constant over great distances. The spring characteristic G preferably corresponds to the clutch release element 9'. At the release distance 0, the spring characteristic G preferably crosses zero, although the fine tuning can essentially guarantee that, in the engaged state of the friction clutch 1', there is essentially always a low releasing force, i.e. the curve is preferably in the positive force range. The slope of the spring characteristic G results from the fact that the greatest possible disengagement relief is to be achieved. The force of the characteristic G can be subtracted from the characteristic H of the cup spring 4', and the resulting characteristic I is preferably formed.

It should be understood that in the vast majority of cases, the clutch discs 13' are typically equipped with spring segments 24' between the friction linings 23', so the spring characteristic K should also be included in the considerations. The characteristic K shows the curve of the spring forces of the spring segments 24', preferably in the range between the disengagement distance 0 (which corresponds to the engaged state) and the disengaged state, which corresponds to disengagement distance 1. In the disengaged state, the clutch disc is typically free of any pressure from the thrust plate 3'. If the characteristic K is subtracted from the resulting characteristic I, the result is a disengagement force curve preferably corresponding to the resultant L. Curve L shows that at the disengagement distance 0, the curve preferably starts with the disengagement force 0, then ascends corresponding to the tuning specified here to approximately one-half of the force of the cup spring 4' corresponding to the characteristic H, and then descends again. The descending branch of curve L preferably corresponds to the resultant I which, starting from the disengagement distance 1, descends to 0 toward disengagement distance 2. Such a decrease to the value 0 within the normal disengagement distance is typically undesirable, since the danger can exist that the disengagement system remains stationary in this position on account of friction, and for example, the clutch pedal cannot return by itself into the starting position. For this reason, a curve of the resultant L is desirable as shown in the dotted portion corresponding to $L_1$.

The curve as shown by $L_1$ can easily be achieved by means of the measures described below. FIGS. 14, 14a, 15, and 16 illustrate these measures. The heads 20' of the spacer bolts 15' can preferably be provided with a contour 21', on the side of contact with the clutch release element 9', which contour can preferably cause a rolling of the clutch release element 9' over the clutch release distance, whereby the bearing area 22' realized in the engaged state corresponding to the diameter Di1 shown in FIGS. 14 and 14a, preferably makes the transition into a bearing area diameter Di2 shown in FIG. 15. Diameter Di2 is preferably significantly less than diameter Di1, so that preferably by means of a change in the lever 27' translation, there is an intervention in the spring force curve of the clutch release element 9'. This is illustrated in FIG. 17 by the dotted curve of the spring characteristic $G_1$ or by the resultant $L_1$. The tuning in the present case can preferably be designed so that approximately after the elimination of the frictional clamping of the clutch disc, when the spring segments 24' are relieved, the change in diameter of the contact between the disengagement element 9' and the contour 21' preferably changes in the direction Di2, so that starting at the clutch release distance 1, the resultant L does not follow the curve of the resultant I, but preferably takes the path $L_1$. The change in translation over the contour 21' can be different, if the slope of the spring characteristic G is selected so that it is flatter, for example, and under some conditions the change in translation can even be eliminated. With a flatter characteristic G, however, there is preferably a lower reduction of the clutch release forces.

Figure 15:
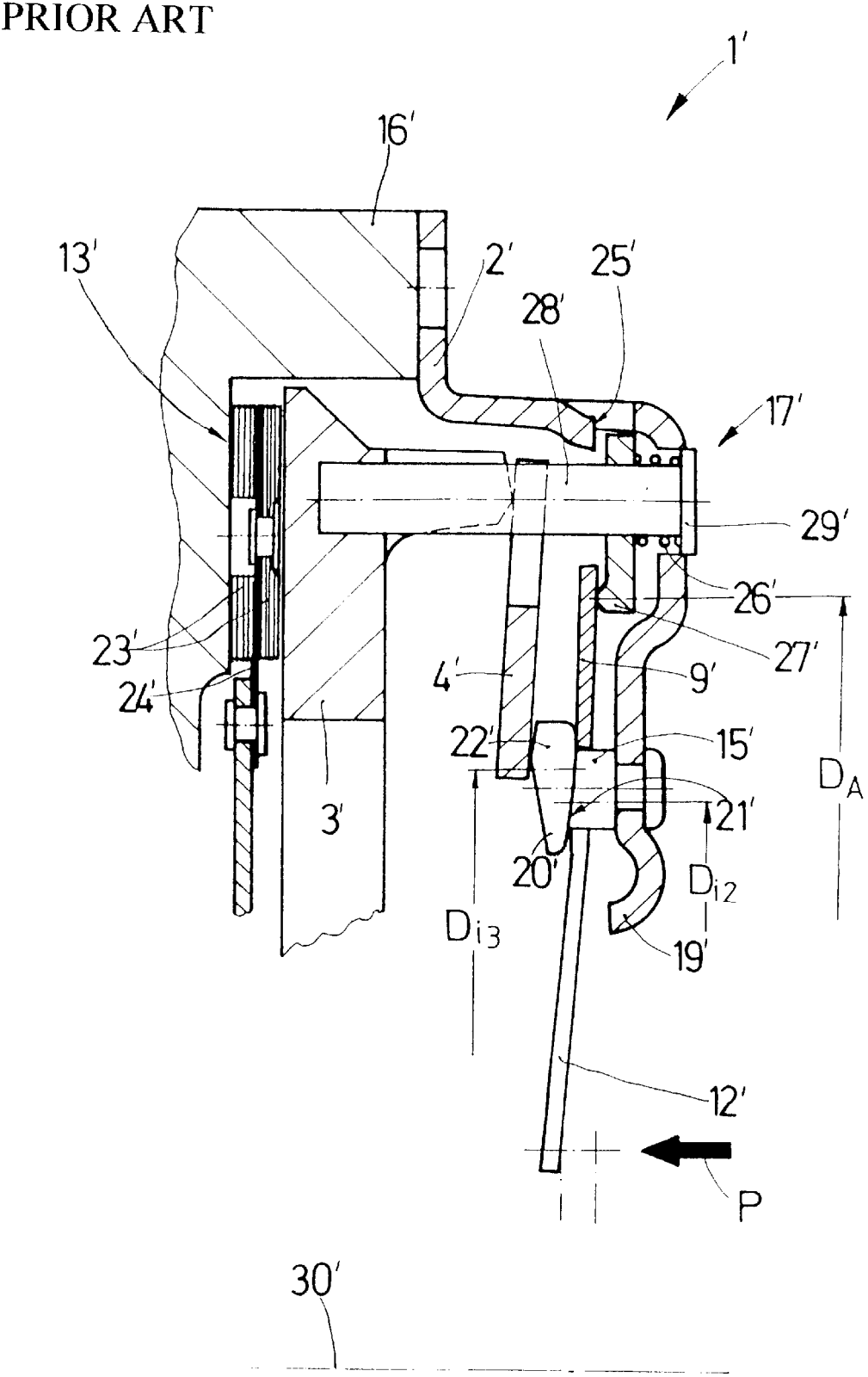

Hardly any additional comments are necessary with regard to FIG. 15, since FIG. 15 essentially shows the disengaged position of the friction clutch 1' shown in FIGS. 14 and 14a. FIG. 15 shows that the lever 27', and the extent of disengagement, are relatively far from the corresponding housing stop 25'.

Figure 16:
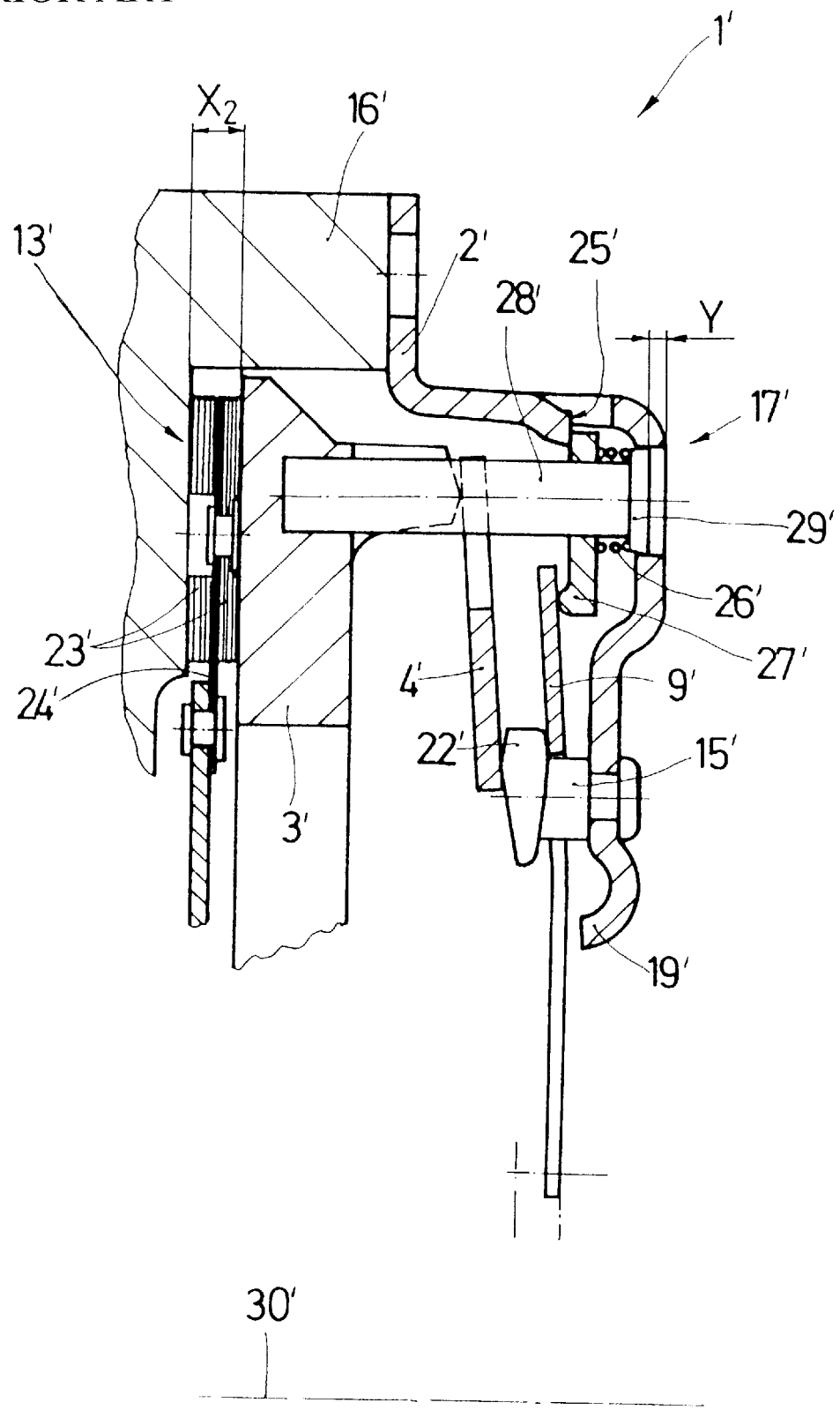

FIG. 8 shows the effect of the wear to the friction linings 23', in relation to FIGS. 14 and 14a. FIGS. 14 and 14a show a clutch disc on which, when the clutch is engaged and thus when the spring segments 24' are compressed, the friction linings 23' are preferably at a distance $X_1$, $X_1$ representing the distance between the counterthrust plate 16' and the thrust plate 3'. In FIG. 16, distance $X_1$ is reduced by wear to the lower value $X_2$. With reference to the description of the wear compensation device 17' given hereinabove, the thrust plate 3' with the bolts 28', preferably move by an amount Y, wherein Y approximately corresponds to the difference between $X_1$ and $X_2$, in a direction preferably towards the counterthrust plate 16'. The adjustment device 17' can then essentially guarantee that the levers 27' remain in their position in relation to the clutch housing 2', preferably due to the housing stops 25', among other things, so that the position of the clutch release element 9' can essentially remain the same, or constant even with wear of the friction linings 23'. The correspondence between the characteristic curves of the clutch release element 9' and of the spring segments 24' thus remains essentially constant. The same is also true for the diameter relationships shown in FIG. 15, with regard to the rolling of the clutch release element 9' on the contour 21'.

Figure 13:
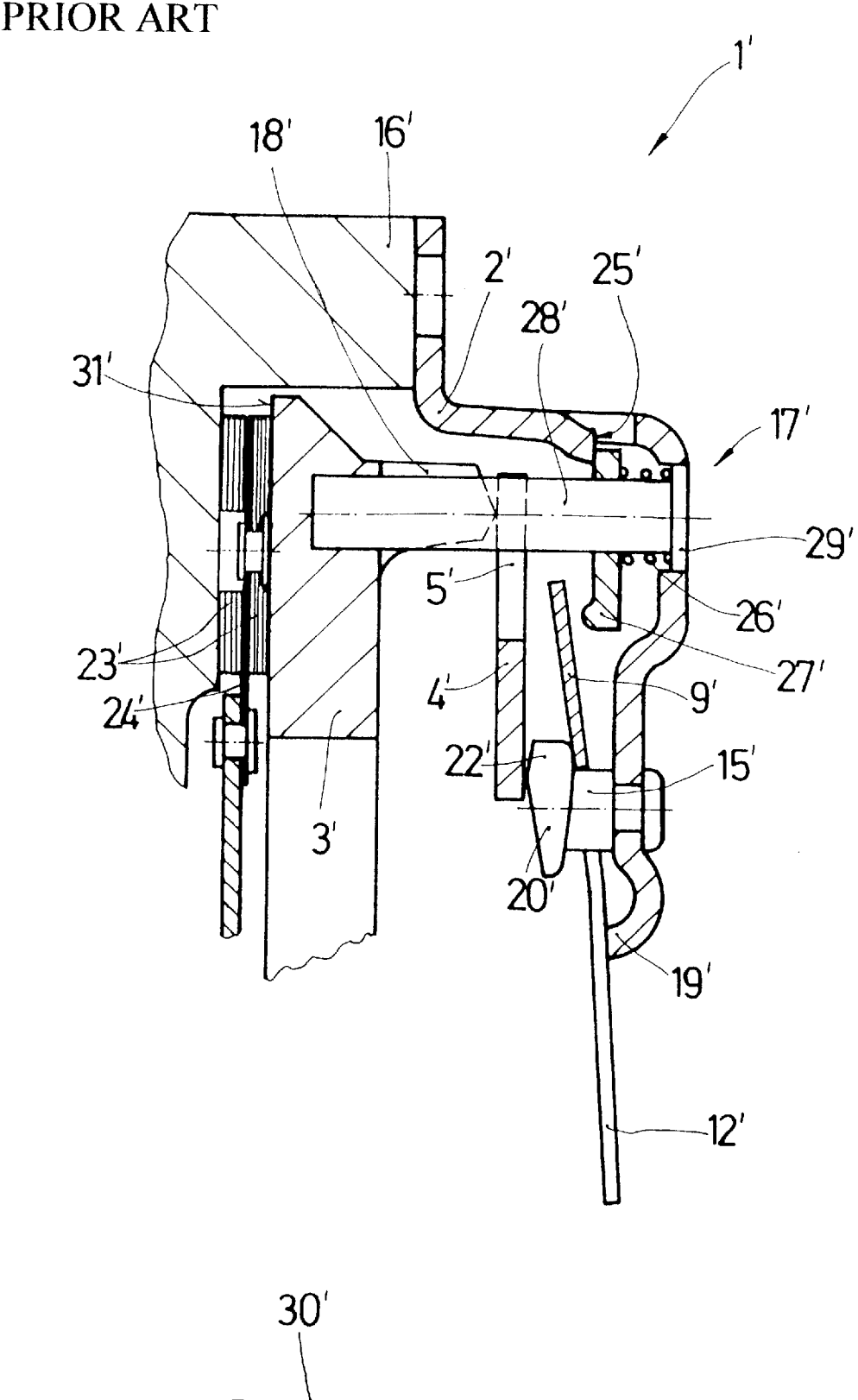
FIGS. 13–16 show the transport position as well as the sequence of motions of an additional variant.

FIG. 13, an explanation of which has been postponed until this point, shows the clutch pressure plate 3' preferably after the installation and, for example, during storage or shipment of the friction clutch 1'. The clutch release element 9' is preferably in a position corresponding to the curve of spring characteristic G in the negative force range. That essentially means that the release element 9' preferably accumulates a residual stress in the engagement direction opposite to the functional position of the release element 9', and thereby preferably does not come into contact with the levers 27'. The clutch release element 9' is preferably held in this position by stops 19' of the clutch housing 2', which stops 19' are preferably located radially inside the spacer bolts 15'. The pressure plate 3' is thus in a stable position and the spring 26' of the wear compensation device 17' can preferably move the levers 27' into their base position even with a low spring force, which corresponds to contact with the housing stops 25'.

During the installation of the pressure plate 3', against the thrust plate 16' and clutch disc 13' and in connection with the first actuation of the friction clutch 1', the clutch release element 9' preferably moves into the operating position and is preferably held in this position, because the clutch release element 9' is fixed, at least to a slight extent, on that side of its zero crossing position as illustrated in FIG. 9. Thus, the clutch release element 9' can preferably exert a releasing force, albeit a slight releasing force, by means of the levers 27' and the bolts 28' on the thrust plate 3'.

It should be understood that all of the embodiments of the present invention may have a clutch release element 9' which may have the configuration illustrated in FIGS. 10 and 10a. Further, the clutch release element 9', in accordance with at least one embodiment of the present invention, the thickness of the clutch release element 9', and the thickness of the tongues 12', can preferably be about 0.4 cm, however, the thickness of the release element 9', and of the tongues 12' can alternatively be about 0.1 cm, 0.11 cm, 0.12 cm, 0.13 cm, 0.14 cm, 0.15 cm, 0.16 cm, 0.17 cm, 0.18 cm, 0.19 cm, 0.2 cm, 0.21 cm, 0.22 cm, 0.23 cm, 0.24 cm, 0.25 cm, 0.26 cm, 0.27 cm, 0.28 cm, 0.29 cm, 0.3 cm, 0.31 cm, 0.32 cm, 0.33 cm, 0.34 cm, 0.35 cm, 0.36 cm, 0.37 cm, 0.38 cm, 0.39 cm, 0.41 cm, 0.42 cm, 0.43 cm, 0.44 cm, 0.45 cm, 0.46 cm, 0.47 cm, 0.48 cm, 0.49 cm, 0.5 cm, 0.51 cm, 0.52 cm, 0.53 cm, 0.54 cm, 0.55 cm, 0.56 cm, 0.57 cm, 0.58 cm, 0.59 cm, 0.6 cm, 0.61 cm, 0.62 cm, 0.63 cm, 0.64 cm, 0.65 cm, 0.66 cm, 0.67 cm, 0.68 cm, 0.69 cm, 0.7 cm, 0.71 cm, 0.72 cm, 0.73 cm, 0.74 cm, 0.75 cm, 0.76 cm, 0.77 cm, 0.78 cm, 0.79 cm, 0.8 cm, 0.81 cm, 0.82 cm, 0.83 cm, 0.84 cm, 0.85 cm, 0.86 cm, 0.87 cm, 0.88 cm, 0.89 cm, 0.9 cm, 0.91 cm, 0.92 cm, 0.93 cm, 0.94 cm, 0.95 cm, 0.96 cm, 0.97 cm, 0.98 cm, 0.99 cm, or 0.1 cm.

The thickness of the cup spring 4', in accordance with at least one embodiment of the present invention, can preferably have a thickness of about 0.6 cm, however, the thickness of the cup spring 4', can alternatively be about 0.1 cm, 0.11 cm, 0.12 cm, 0.13 cm, 0.14 cm, 0.15 cm, 0.16 cm, 0.17 cm, 0.18 cm, 0.19 cm, 0.2 cm, 0.21 cm, 0.22 cm, 0.23 cm, 0.24 cm, 0.25 cm, 0.26 cm, 0.27 cm, 0.28 cm, 0.29 cm, 0.3 cm, 0.31 cm, 0.32 cm, 0.33 cm, 0.34 cm, 0.35 cm, 0.36 cm, 0.37 cm, 0.38 cm, 0.39 cm, 0.4 cm, 0.41 cm, 0.42 cm, 0.43 cm, 0.44 cm, 0.45 cm, 0.46 cm, 0.47 cm, 0.48 cm, 0.49 cm, 0.5 cm, 0.51 cm, 0.52 cm, 0.53 cm, 0.54 cm, 0.55 cm, 0.56 cm, 0.57 cm, 0.58 cm, 0.59 cm, 0.61 cm, 0.62 cm, 0.63 cm, 0.64 cm, 0.65 cm, 0.66 cm, 0.67 cm, 0.68 cm, 0.69 cm, 0.7 cm, 0.71 cm, 0.72 cm, 0.73 cm, 0.74 cm, 0.75 cm, 0.76 cm, 0.77 cm, 0.78 cm, 0.79 cm, 0.8 cm, 0.81 cm, 0.82 cm, 0.83 cm, 0.84 cm, 0.85 cm, 0.86 cm, 0.87 cm, 0.88 cm, 0.89 cm, 0.9 cm, 0.91 cm, 0.92 cm, 0.93 cm, 0.94 cm, 0.95 cm, 0.96 cm, 0.97 cm, 0.98 cm, 0.99 cm, 0.1 cm, 1.1 cm, 1.2 cm, 1.3 cm, 1.4 cm, or 1.5 cm.

The release element 9' and the cup spring 4', in accordance with at least one embodiment of the present invention, can typically be made from steel, or another suitable material, which would retain its properties at high speeds and or high temperatures.

In accordance with at least one embodiment of the present invention, the length of the tongues 12', taken from point A to point B shown in FIG. 10a, can preferably be about 8.5 cm. Alternatively, the length of tongues 12' can preferably be 3.2 cm, 3.4 cm, 3.6 cm, 3.8 cm, 4.2 cm, 4.4 cm, 4.6 cm, 4.8 cm, 5.0 cm, 5.2 cm, 5.4 cm, 5.6 cm, 5.8 cm, 6.0 cm, 6.2 cm, 6.4 cm, 6.6 cm, 6.8 cm, 7.0 cm, 7.2 cm, 7.4 cm, 7.6 cm, 7.8 cm, 8.0 cm, 8.2 cm, 8.4 cm, 8.6 cm, 8.8 cm, 9.0 cm, 9.2 cm, 9.4 cm, 9.6 cm, 9.8 cm, or 10.0 cm.

The thickness of the clutch release element 9', thickness of the cup spring 4', and the length of the tongues 12' are not to be taken as limited to the above-mentioned dimensions.

Figure 18:
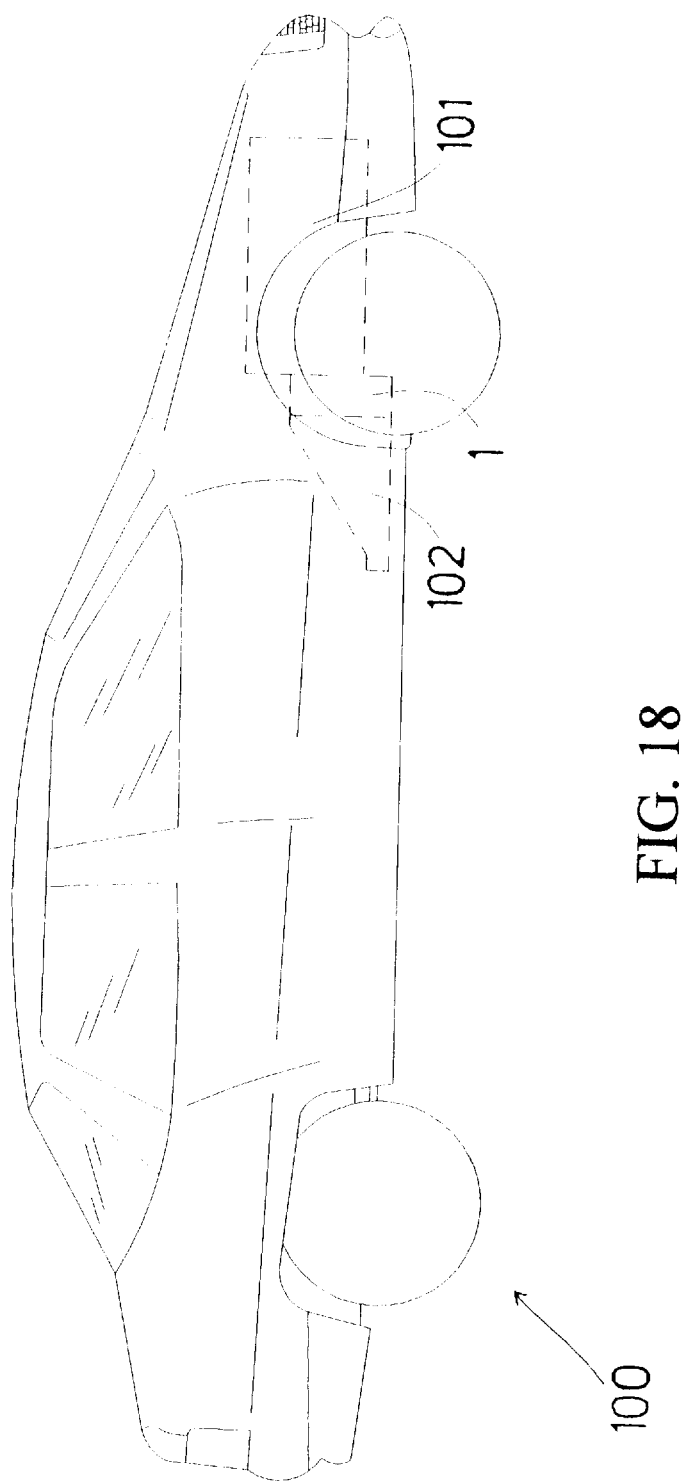
FIG. 18 shows a typical motor vehicle incorporating the present invention.

FIG. 18 shows what could be considered to be a typical motor vehicle 100, which motor vehicle 100 typically includes an internal combustion engine 101, preferably mounted in the forward portion thereof. The motor vehicle could also typically be include a transmission 102 for transmission of mechanical power from the engine 101 to the wheels. If the motor vehicle 100 has a manual transmission 102, the friction clutch 1', in accordance with the embodiments of the present invention may also be included, for engaging the transmission 102 with the engine 101.

One feature of the invention resides broadly in the motor vehicle friction clutch with a pressure plate which is fastened with the interposition of a clutch disc with friction linings to a flywheel, and has a common axis of rotation with the flywheel, comprising an application plate located non-rotationally—but so that it can move axially—in a clutch housing, and an application means to apply the application force, characterized by the fact that the clutch housing 11 is provided with an axial guide 38 for a transmission element 20 which is located between the application means 31 and the application plate 13, on which the transmission element 20, as long as there is no transmission of an application force between the application plate 13 and the friction linings 21 of the clutch disc 17 during an engagement and release movement, can track the movement of an engagement and release mechanism 46, 47, while as soon as it, the application plate comes in contact with the friction linings 21 of the clutch disc 17 for the transmission of the application force, it can track by means of a deformation the movement of the engagement and release mechanism 46, 47 at its contact point 24 with the application plate 13 with a translation which, after the generation of a clamping connection between the transmission element 20 and the axial guide 38, is a function of the distance between the point of engagement of the application means 31 on the transmission element 20 and the contact point 24 of the transmission element with the application plate 13 in relation to the distance between this contact point and the clamping connection of the transmission element 20 on the axial guide 38.

Another feature of the invention resides broadly in the motor vehicle friction clutch with studs provided on the clutch housing which extend parallel to the axis of rotation of the pressure plate toward the application plate, characterized by the fact that the axial guide 38 is formed by these studs 36 which are engaged in recesses 34 of the transmission element 20.

Yet another feature of the invention resides broadly in the motor vehicle friction clutch characterized by the fact that the studs 36 are each surrounded by a spring 52 which keeps the transmission element 20 in contact with the application plate 13 and is supported on the clutch housing 11.

Still another feature of the invention resides broadly in the motor vehicle friction clutch characterized by the fact that the application means 31 are formed by a membrane spring 32 which is located between the clutch housing 11 and the transmission element 20.

A further feature of the invention resides broadly in the motor vehicle friction clutch characterized by the fact that the studs 36 are mounted in the clutch housing 11 so that they can move in the axial direction and support a lever 55, by means of which they can be tilted when pressurized or acted on or pushed by the transmission element 20 in the respective bearing.

Another feature of the invention resides broadly in the motor vehicle friction clutch characterized by the fact that the transmission element 20 is formed by a membrane disc 30, which comes into contact with one side against a shoulder 25 of the application plate 13, which shoulder 25 acts as a contact point 24, and with its other side is supported by means of the at least one spring 52 on the clutch housing 11, which spring 52 corresponds to the studs 36 of the axial guide 38.

Yet another feature of the invention resides broadly in the motor vehicle friction clutch characterized by the fact that the application plate 13 is configured in the circumferential area with energy storing devices 50 which act on the clutch housing 11 to press against the transmission element 20, and has at least one stop or shoulder 72 on its side facing the transmission element 20, next to each of the studs 36.

Still another feature of the invention resides broadly in the motor vehicle friction clutch characterized by the fact that the application plate 13 is held in contact against the stop 25 by means of a retaining means 70 against the action of an energy storing device 68 which pushes the application plate 13 away from the clutch housing 11 and is engaged in the circumferential area with the application plate 13.

A further feature of the invention resides broadly in the motor vehicle friction clutch with an arrangement which includes the lining springs on the clutch disc, which arrangement, during the release process, by means of a portion of the actuation distance of the engagement and release mechanism, effects a gradual decrease of the torque transmitted by the friction clutch or the clutch disc, characterized by the fact that the transmission element 20, as a result of its location on the axial guide 38 and pressurization by means of at least one spring 32, 52 toward the application plate, with respect to its travel during each engagement process, can be once again adjusted to the current thickness of the friction linings 21 and of the resilience of the lining 80 on the clutch disc 17.

Another feature of the invention resides broadly in the motor vehicle friction clutch characterized by the fact that the application means 31 are formed by an engagement mechanism 47 which acts on the transmission element 20, and in which the travel can be adjusted to the respective movement segment of the transmission element 20.

Yet another feature of the invention resides broadly in the motor vehicle friction clutch characterized by the fact that the transmission element 20 is formed by a number of lever-like individual elements which come into contact with one side on the stop or shoulder 25 of the application plate 13, and are supported with their other side by means of the at least one spring 52 on the clutch housing 11.

One feature of the invention resides broadly in the friction clutch, in particular for motor vehicles, comprising a thrust plate mounted in a housing so that it cannot rotate but can move axially, and which is pressed by the force of a cup spring with the interposition of a clutch disc with friction linings toward a counterthrust plate, and the housing is fastened to the counterthrust plate, whereby the cup spring presses with its uninterrupted outside diameter against the thrust plate and is in contact with its inside diameter interrupted by notches on the housing, a clutch release mechanism to release the thrust plate against the force of the cup spring, characterized by the fact that located in the housing 2' there are spacer bolts 6' on a middle diameter, which extend toward the thrust plate 3', the cup spring 4' with its notches 5' surrounds the spacer bolts 6', between the cup spring 4' and thrust plate 3' there is a clutch release element 9', which is realized approximately in the shape of a membrane spring, which is in contact with its outside diameter on the thrust plate, with openings 1' for the passage of the spacer bolts 6' and with flexible tongues 12' running radially inward, and which is axially braced on the spacer bolt heads 7', whereby cup springs 4' and clutch release elements 9' have essentially the same outside diameter, and there is a spacer or direct contact element wire ring 13' located between them.

Another feature of the invention resides broadly in the friction clutch characterized by the fact that the clutch release element 9', starting from the outside diameter, has slots 11' which run radially inward, which are offset circumferentially from the openings 10' for the passage of the spacer bolts 6' and extend at least to the latter.

Yet another feature of the invention resides broadly in the friction clutch characterized by the fact that the clutch release element 9' is provided with a slight axial prestress, and that contact with the spacer bolt heads 7' is guaranteed when the clutch is engaged.

Still another feature of the invention resides broadly in the friction clutch characterized by the fact that the prestress is designed so that it is approximately eliminated when the friction clutch 1' is disengaged.

A further feature of the invention resides broadly in the friction clutch, in particular for motor vehicles, comprising a thrust plate mounted in a housing so that it cannot rotate but can move axially, and which is pressed by the force of a cup spring with the interposition of a clutch disc with friction linings toward a counterthrust plate and the housing is fastened to the counterthrust plate, whereby the cup spring presses against the thrust plate with its outside diameter and is in contact with its inside diameter on the housing, a clutch release mechanism to release the thrust plate against the force of the cup spring, characterized by the fact that the clutch release mechanism has a clutch release element 9' which is designed in the form of a component similar to a membrane spring, which is supported by means of a middle diameter by means of spacer bolts 6' on the housing 2', by means of its outside diameter on the thrust plate 3', and is provided radially inward with flexible tongues 12', whereby the clutch release element 9', when the friction clutch is engaged, exerts only a slight releasing force, and with increasing movement toward a disengaged clutch there is a decrease of the releasing force to a value of approximately 0.

Another feature of the invention resides broadly in the friction clutch characterized by the fact that the clutch release element 9' interacts with a wear compensation device 17' which, if there is wear of the friction linings, influences the releasing force curve either insignificantly or not at all.

Yet another feature of the invention resides broadly in the friction clutch characterized by the fact that between the outside diameter of the clutch release element 9' and the thrust plate 3', there is a wear compensation device 17' which, when there is wear of the friction linings of the clutch disc, changes the relationship between the thrust plate and the clutch release element so that the position of the clutch release element 9' remains unchanged, regardless of the wear state of the friction lining.

Still another feature of the invention resides broadly in the friction clutch, in particular for motor vehicles, comprising a clutch housing which is fastened to a counterthrust plate and defines an axis of rotation, a thrust plate mounted in the clutch housing and guided so that it cannot rotate but can be moved axially and has a friction surface to clamp a clutch disc between the thrust plate and the counterthrust plate, a cup spring between the thrust plate and the clutch housing to generate the clamping force for the clutch disc, a clutch release mechanism to eliminate the clamping force and to release the thrust plate, characterized by the fact that the clutch release mechanism includes a clutch release element 9' which has a component similar to a membrane spring which is located and designed so that when the friction clutch 1' is engaged, it exerts a low releasing force, and there is an increase of the releasing force with an increasing movement in the direction of the disengagement of the clutch.

A further feature of the invention resides broadly in the friction clutch characterized by the fact that the clutch release element 9' interacts with a wear compensation device 17' which, when there is wear of the friction lining 23', influences the releasing force curve only insignificantly or not at all.

Another feature of the invention resides broadly in the friction clutch characterized by the fact that the wear compensation device 17' is located between the outside diameter of the clutch release element 9' and the thrust plate, and when there is wear to the friction linings 23', the relationship between the thrust plate 3' and the clutch release element 9' changes so that, regardless of the amount of wear to the friction lining 23', the installed position of the clutch release element 9' remains unchanged.

Yet another feature of the invention resides broadly in the friction clutch characterized by the fact that the clutch release element 9' has numerous openings distributed on the circumference on a concentric diameter, into which spacer bolts 15' fastened to the clutch housing 2' extend, and the clutch release element 9' is supported on one hand on the heads 20' of the spacer bolts 15' and on the other hand, in the vicinity of its outside diameter, on the thrust plate 3'.

Still another feature of the invention resides broadly in the friction clutch characterized by the fact that the clutch release element 9', when the friction clutch 1' is engaged, exerts a defined low releasing force on the thrust plate 3', and therefore a secure, unilateral contact with the heads 20' of the spacer bolts 15' is guaranteed.

A further feature of the invention resides broadly in the friction clutch characterized by the fact that the cup spring 4' is supported on one side on the thrust plate 3' and on the other side on the heads 20' of the spacer bolts 15'.

Another feature of the invention resides broadly in the friction clutch characterized by the fact that the spacer bolts 15' extend from the clutch housing 2' toward the thrust plate 3', and the clutch release element 9' is in contact on the side of the heads 20' facing the clutch housing 2', and the cup spring 4' is in contact on the side facing the thrust plate 3'.

Yet another feature of the invention resides broadly in the friction clutch characterized by the fact that the cup spring 4' is in contact on its inside diameter with the spacer bolts 15' and on its outside diameter with the thrust plate 3'.

Still another feature of the invention resides broadly in the friction clutch characterized by the fact that the thrust plate 3' has several bolts 28' distributed on the circumference, which run parallel to the axis of rotation 30' in the direction of the clutch housing 2', pointing away from the friction surface of the thrust plate 3', radially outside the clutch release element 9', each bolt 28' runs through a lever 27' which can be fixed on the bolt 28' by a clamping force, pressure is applied to each lever 27' in its terminal area pointing radially inward, radially inside the bolt 28', by the clutch release element 9' pointing away from the friction surface of the thrust plate 3', and is in contact with its terminal area pointing radially outward, radially outside the bolt 28', against a housing stop 25', and a spring 26' pushes each lever toward the thrust plate until it makes contact with the housing stop 25'.

A further feature of the invention resides broadly in the friction clutch characterized by the fact that each head 20 of a spacer bolt 15', on the bearing area side for the release element 9', has a contour 21, which produces a radial shift of the support diameter during the clutch release process from the greater value $D_{i1}$ to the lesser value $D_{i2}$, and thus a change in translation in the sense of an increase of the clutch release force.

Another feature of the invention resides broadly in the friction clutch characterized by the fact that the clutch release element 9', when the thrust plate is in the position for installation or transport, is in a position in which it attempts to exert an engagement force on the thrust plate, whereby it comes into contact radially inside the spacer bolts 15' on stops 19 of the clutch housing 2' by means of residual stress.

Some examples of release assemblies for friction clutches, and some examples of friction clutches are disclosed in the following U.S. Pat. Nos. 4,201,282 to Ernst et al. on May 6, 1980, entitled "Clutch Release Assembly and Bearing Therefor"; No. 3,920,107 to Limbacher on Nov. 18, 1975, entitled "Self-Aligning Clutch Release Bearing Arrangement"; No. 4,781,050 to Link et al. on Oct. 3, 1989, entitled "Clutch Arrangement"; No. 4,542,813 to Schierling on Sep. 24, 1985, entitled "Frictional Clutch Assembly"; and No. 4,637,505 to Huber on Jan. 20, 1987, entitled "Fluid-operated Clutch Disengaging Apparatus".

Types of membrane springs which could be used in accordance with the embodiments of the present invention are disclosed in the following U.S. Pat. Nos. 5,240,227 to Sich on Aug. 31, 1993, entitled "Electromagnetically Operated Valve"; No. 4,890,815 to Hascher et al. on Jan. 2, 1990, entitled "Valve with Membrane Spring"; No. 4,535,816 to Feder et al. on Aug. 20, 1985, entitled "Pressure Controller"; No. 3,902,527 to Schwerin et al. on Sep. 2, 1975, entitled "Electromagnetically Actuatable Multipath Valve"; and No. 2,117,482 to Klix entitled "Clutch Lever Plate".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. P 44 05 344.4, filed on Feb. 19, 1994, having inventor Reinhold Weidinger, and DE-OS P 44 05 344.4 and DE-PS P 44 05 344.4, are hereby incorporated by reference as if set forth in their entirety herein.

A membrane spring which may be utilized in accordance with the embodiments of the present invention is disclosed in German Laid Open Patent Application DE-OS 43 22 506. German Laid Open Patent Application DE-OS 43 22 506, as well as its published equivalent, and other equivalents or corresponding applications, if any, in corresponding cases in the Federal Republic of Germany and elsewhere, and the references cited in any of the documents cited herein, are hereby incorporated by reference as if set forth in their entirety herein.

The corresponding foreign patent publication applications, namely, Federal Republic of Germany Patent Application Nos. P 44 12 106.7, filed on Apr. 8, 1994 and P 43 23 857.2, filed on Jul. 16, 1993, having inventor Reinhold WEIDINGER, and DE-OS P 44 12 106.7 and P 43 23 857.2 and DE-PS P 44 12 106.7 and P 43 23 857.2, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A motor vehicle clutch, said clutch comprising:
a clutch disc with friction linings;
a pressure plate having an axis of rotation;
said pressure plate being disposed to be engageable with and disengageable from said friction linings;
a disc-shaped member;
said disc-shaped member being disposed concentrically about the axis of rotation;
said disc-shaped member being disposed to be axially movable in its totality along the axis of rotation;
said disc-shaped member being disposed to be translatable along all points of said disc-shaped member in a first direction to engage said pressure plate with said friction linings;
said disc-shaped member being disposed to be translatable along all points of said disc-shaped member in a second direction to disengage said disc-shaped member from said friction linings;
means for actuating said disc-shaped member to engage and disengage said pressure plate with said friction linings;
said disc-shaped member being movable in the first direction in response to said actuating means to engage said pressure plate with said friction linings;
said disc-shaped member being movable in the second direction in response to said actuating means to disengage said pressure plate from said friction linings;
said disc-shaped member comprises means for receiving a force from said actuating means and transmitting a force to said pressure plate during engagement of said pressure plate with said friction linings; and
said means for receiving a force and transmitting a force comprises fulcrum means for pivoting said disc-shaped member about a pivoting area during engagement of said pressure plate with said friction linings.

2. The motor vehicle clutch according to claim 1, wherein:
said disc-shaped member is disposed to move towards said pressure plate during translation of said disc-shaped member in the first direction of translation;
said clutch comprises biasing means for urging translation of said disc-shaped member towards said pressure plate in the first direction of translation; and
said biasing means comprises spring means disposed to transmit a force to said disc-shaped member to move said disc-shaped member towards said pressure plate.

3. The motor vehicle clutch according to claim 2, wherein:
said clutch comprises means for guiding the translation of said disc-shaped member in the first and second directions;
said clutch comprises a housing;
said disc-shaped member is disposed in said housing;
said guiding means comprises one of A), B) and C):
A) a tubular portion of said housing;
said tubular portion of said housing is disposed concentrically about the axis of rotation;

said disc-shaped member is disposed within said tubular portion of said housing;

said tubular portion of said housing comprising an interior surface;

said interior surface of said tubular portion is disposed adjacent said disc-shaped member; and said interior surface of said tubular portion comprises a guide surface disposed to guide the translation of said disc-shaped member in the first and second directions of translation;

B) at least one stud;

said at least one stud has a longitudinal axis;

said at least one stud is disposed in said housing with the longitudinal axis of said at least one stud substantially parallel with the axis of rotation;

said at least one stud comprises an outer surface extending along the axis of rotation; and said outer surface of said at least one stud comprises a guide surface disposed to guide the translation of said disc-shaped member in the first and second directions; and C) at least one rod;

said at least one rod has a longitudinal axis;

said at least one rod is disposed with the longitudinal axis of said at least one rod substantially parallel with the axis of rotation;

an end of said rod is fixedly attached to said pressure plate;

said at least one rod comprises an outer surface extending along the axis of rotation; and said outer surface of said at least one rod comprises a guide surface disposed to guide the translation of said disc-shaped member in the first and second directions; and said disc-shaped member is disposed to cooperate with said guiding means to guide the translation of said disc-shaped member.

4. The clutch according to claim 3, wherein:

said disc-shaped member is disposed to move away from said pressure plate during translation of said disc-shaped member in the second direction of translation;

said clutch comprises means for limiting relative displacement of said disc-shaped member away from said pressure plate in the second direction of translation;

said limiting means comprises at least one stop member to stop relative displacement of said disc-shaped member away from said pressure plate;

said at least one stop member is disposed to permit contact of said at least one stop member with said disc-shaped member to limit relative translation of said disc-shaped member away from said pressure plate; and said at least one stop member is fixedly attached to said pressure plate.

5. The clutch according to claim 4, wherein:

said actuating means comprises a membrane spring;

said membrane spring is disposed concentrically about the axis of rotation; and said membrane spring is disposed to transmit the force to said third portion of said disc-shaped member.

6. A motor vehicle clutch, said clutch comprising:

a clutch disc with friction linings;

a pressure plate having an axis of rotation;

said pressure plate being disposed to be engageable with and disengageable from said friction linings;

a disc-shaped element;

said disc-shaped element being disposed concentrically about the axis of rotation;

said disc-shaped element being disposed to be axially movable in its totality along the axis of rotation;

said disc-shaped element being disposed to be translatable along all points of said disc-shaped element in a first direction to engage said pressure plate with said friction linings;

said disc-shaped element being disposed to be translatable along all points of said disc-shaped element in a second direction to disengage said disc-shaped element from said friction linings;

means for actuating said disc-shaped element to engage and disengage said pressure plate with said friction linings;

said disc-shaped element being movable in the first direction in response to said actuating means to engage said pressure plate with said friction linings; and said disc-shaped element being movable in the second direction in response to said actuating means to disengage said pressure plate from said friction linings.

7. The motor vehicle clutch according to claim 6 wherein:

said disc-shaped element comprises means for receiving a force from said actuating means and transmitting a force to said pressure plate during engagement of said pressure plate with said friction linings; and said means for receiving a force and transmitting a force comprises fulcrum means for pivoting said disc-shaped element about a pivoting area during engagement of said pressure plate with said friction linings.

8. The motor vehicle clutch according to claim 7 wherein said means for receiving a force and transmitting a force of said disc-shaped element comprises:

said fulcrum means of said disc-shaped element comprises a first portion of said disc-shaped member;

said first portion of said disc-shaped element is disposed a radial distance from the axis of rotation;

said disc-shaped element comprises a second portion;

said second portion of said disc-shaped element is disposed to transmit a force to said pressure plate;

said second portion of said disc-shaped element is disposed a first radial distance from said first portion of said disc-shaped element;

said disc-shaped element comprises a third portion;

said third portion of said disc-shaped element is disposed to receive a force from said actuating means;

said third portion of said disc-shaped element is disposed a second radial distance from said first portion of said disc-shaped element, the second radial distance being greater than the first radial distance; and said second portion of said disc-shaped element is disposed radially between said first and third portions of said disc-shaped element.

9. The clutch according to claim 8, wherein:

said clutch comprises a housing;

said disc-shaped element is disposed within said housing;

said clutch comprises means for guiding the axial translation of said disc-shaped element;

said guiding means comprises one of A), B) and C):

A) a tubular portion of said housing;

said tubular portion of said housing is disposed concentrically about the axis of rotation;

an interior surface of said tubular portion is adjacent said disc-shaped element; and said interior surface of said tubular portion comprises a guide surface disposed to guide the translation of said disc-shaped element in the first and second directions;

B) at least one stud;

said at least one stud has a longitudinal axis;

said at least one stud is disposed in said housing with the longitudinal axis of said at least one stud substantially parallel with the axis of rotation;

said at least one stud comprises an outer surface extending along the axis of rotation; and said outer surface of said at least one stud comprises a guide surface disposed to guide the translation of said disc-shaped element in the first and second directions;

C) at least one screw;

said at least one screw has a longitudinal axis;

said at least one screw is disposed with the longitudinal axis of said at least one screw substantially parallel with the axis of rotation;

an end of said screw is fixedly connected to said pressure plate;

said at least one screw comprises an outer surface extending along the axis of rotation; and said outer surface of said at least one screw comprises a guide surface disposed to guide the translation of said disc-shaped element in the first and second directions; and said disc-shaped element cooperatively contacts said guide surface of said guiding means to guide translation of said disc-shaped element.

10. The clutch according to claim 9, wherein:

said actuating means comprises a membrane spring;

said membrane spring is disposed concentrically about the axis of rotation; and said membrane spring is disposed to transmit the force to said third portion of said disc-shaped element.

11. The clutch according to claim 10, wherein:

said disc-shaped element is disposed to move away from said pressure plate during translation of said disc-shaped element in the second direction of translation;

said clutch comprises means for limiting relative displacement of said disc-shaped element from said pressure plate in the second direction of translation;

said limiting means comprises at least one stop;

said at least one stop is disposed to be contactable with said disc-shaped element and limit relative translation of said disc-shaped element away from said pressure plate; and said at least one stop is disposed a fixed axial distance from said pressure plate.

12. The clutch according to claim 11, wherein:

said disc-shaped element is disposed to move towards said pressure plate during translation of said disc-shaped element in the first direction of translation;

said clutch comprises biasing means for urging translation of said disc-shaped element towards said pressure plate in the first direction of translation; and said biasing means comprises at least one spring disposed to transmit a force to said disc-shaped element, the force transmitted to said disc-shaped element to move said disc-shaped element towards said pressure plate.

13. A motor vehicle clutch, said clutch comprising:

a clutch disc with friction linings;

a pressure plate having an axis of rotation;

said pressure plate being disposed to be engageable with and disengageable from said friction linings;

a disc-shaped element;

said disc-shaped element being disposed concentrically about the axis of rotation;

said disc-shaped element being disposed to engage said pressure plate with said friction linings upon actuation of said disc-shaped element;

means for actuating said disc-shaped element to engage said pressure plate with said friction linings;

said actuating means comprising a membrane spring;

said membrane spring being disposed concentrically about the axis of rotation;

said membrane spring being disposed to transmit a force to said disc-shaped element to engage said pressure plate with said friction linings;

said disc-shaped element comprising means for receiving the force from said membrane spring and transmitting a force to said pressure plate during engagement of said pressure plate with said friction linings;

said means for receiving the force from said membrane spring and transmitting a force to said pressure plate comprising:

fulcrum means for pivoting said disc-shaped element about a pivoting area during engagement of said pressure plate with said friction linings;

said fulcrum means comprising a first portion of said disc-shaped element;

said first portion of said disc-shaped element being disposed a radial distance from the axis of rotation;

a second portion of said disc-shaped element;

said second portion of said disc-shaped element being disposed to transmit a force to said pressure plate;

said second portion of said disc-shaped element being disposed a first radial distance from said first portion of said disc-shaped element;

a third portion of said disc-shaped element;

said third portion of said disc-shaped element being disposed to receive the force from said membrane spring;

said third portion of said disc-shaped element being disposed a second radial distance from said first portion of said disc-shaped element, with the second radial distance being greater than the first radial distance; and said second portion of said disc-shaped element being disposed radially between said first and third portions of said disc-shaped element.

14. The clutch according to claim 13, wherein:

said disc-shaped element is disposed to be axially movable in its totality along the axis of rotation;

said disc-shaped element is disposed to be translatable along all points of said disc-shaped element in a first direction to engage said pressure plate with said friction linings;

said disc-shaped element is disposed to be translatable along all points of said disc-shaped element in a second direction to disengage said disc-shaped element from said friction linings;

said disc-shaped element is movable in the first direction in response to said actuating means to engage said pressure plate with said friction linings; and said disc-shaped element is movable in the second direction to disengage said pressure plate from said friction linings.

15. The clutch according to claim 14, wherein:

said clutch comprises a housing;

said disc-shaped element is disposed within said housing;

said clutch comprises means for guiding the axial translation of said disc-shaped element;

said guiding means comprises one of A), B) and C):

A) said clutch comprises a housing;
   a tubular portion of said housing disposed concentrically about the axis of rotation;
   said disc-shaped element is disposed within said tubular portion of said housing;
   an interior surface of said tubular portion is adjacent said disc-shaped element;
   said interior surface of said tubular portion comprises
a guide surface disposed to guide the axial translation of said disc-shaped element in the first and second directions;

B) at least one stud;
   said at least one stud has a longitudinal axis;
   said at least one stud is disposed in said housing with the longitudinal axis of said at least one stud substantially parallel with the axis of rotation;
   said at least one stud comprises an outer surface extending along the axis of rotation;
   said outer surface of said at least one stud comprises
a guide surface disposed to guide the axial translation of said disc-shaped element in the first and second directions;

C) at least one screw;
   said at least one screw has a longitudinal axis;
   said at least one screw is disposed with the longitudinal axis of said at least one screw substantially parallel with the axis of rotation;
   an end of said screw is fixedly connected to said pressure plate;
   said at least one screw comprises an outer surface extending along the axis of rotation; and
   said outer surf ace of said at least one screw comprises
a guide surface disposed to guide the axial translation of said disc-shaped element in the first and second directions; and said disc-shaped element is disposed to cooperate with said guide surface of said guiding means to guide translation of said disc-shaped element.

16. The clutch according to claim 15, wherein:

said disc-shaped element is disposed to move away from said pressure plate during translation of said disc-shaped element in the second direction of translation;

said clutch comprises means for limiting relative displacement of said disc-shaped element from said pressure plate in the second direction of translation;

said limiting means comprises at least one stop;

said at least one stop is disposed to be contactable with said disc-shaped element and limit relative translation of said disc-shaped element away from said pressure plate; and said at least one stop is disposed a fixed axial distance from said pressure plate.

17. The clutch according to claim 16, wherein:

said disc-shaped element is disposed to move towards said pressure plate during translation of said disc-shaped element in the first direction of translation;

said clutch comprises biasing means for urging translation of said disc-shaped element towards said pressure plate in the first direction of translation; and said biasing means comprises at least one spring disposed to transmit a force to said disc-shaped element, the force transmitted to said disc-shaped element being directed towards said pressure plate to move said disc-shaped element towards said pressure plate.

18. The clutch according to claim 17, wherein:

said guiding means comprises item B);

said at least one spring is disposed about said at least one stud; and said at least one spring is disposed between said housing and said disc-shaped element.

19. The clutch according to claim 15, wherein:

said guiding means comprises item C); and said at least one stop is disposed on the opposite end of said screw.

20. The clutch according to claim 15, wherein:

said guiding means comprises item B); and said guiding means further comprises one of items D) and E):

D) said at least one stud is fixedly attached to said clutch housing; and
   said fulcrum area of said fulcrum means comprises a portion of said guide surface of said guiding means; and E) said at least one stud is slidably mounted within said housing to move substantially parallel with the axis of rotation;
   said guiding means further comprises an arm attached to said stud;
   said arm is disposed between said disc-shaped element and said stud;
   said arm extends radially outward from said at least one stud to permit contact of said arm with said first portion of said disc-shaped element; and
   said arm comprising said fulcrum area of said fulcrum means.

* * * * *

UNITED STATES PATENT AND TRADEMARK OFFICE
CERTIFICATE OF CORRECTION

PATENT NO. : 5,810,143
DATED : September 22, 1998
INVENTOR(S) : Reinhold WEIDINGER It is certified that error appears in the above-identified patent and that said Letters Patent is hereby corrected as shown below:

In column 6, line 46, after 'stops', delete "dr" and insert --or--.

Signed and Sealed this

First Day of June, 1999

Attest:

Q. TODD DICKINSON

Attesting Officer

Acting Commissioner of Patents and Trademarks